US008493830B2

(12) United States Patent
Ide

(10) Patent No.: US 8,493,830 B2
(45) Date of Patent: Jul. 23, 2013

(54) OPTICAL INFORMATION REPRODUCING APPARATUS

(71) Applicant: Hitachi Media Electronics Co., Ltd., Oshu (JP)

(72) Inventor: Tatsuro Ide, Tokyo (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 0 days.

(21) Appl. No.: 13/685,761

(22) Filed: Nov. 27, 2012

(65) Prior Publication Data

US 2013/0135978 A1 May 30, 2013

(30) Foreign Application Priority Data

Nov. 28, 2011 (JP) ................................. 2011-258428

(51) Int. Cl.
*G11B 7/00* (2006.01)

(52) U.S. Cl.
USPC ...................................... 369/112.01; 369/103

(58) Field of Classification Search
USPC ............... 369/112.01, 112.02, 112.03, 44.42, 369/44.23, 44.24, 103, 112.1, 112.15
See application file for complete search history.

(56) References Cited

U.S. PATENT DOCUMENTS 7,486,424 B2 * 2/2009 Kanaoka et al. ................ 359/22
2008/0205246 A1 8/2008 Shimano et al.
2012/0002516 A1 1/2012 Ide

FOREIGN PATENT DOCUMENTS

JP 2008-310942 12/2008

* cited by examiner

*Primary Examiner* — Nabil Hindi
(74) *Attorney, Agent, or Firm* — Antonelli, Terry, Stout & Kraus, LLP.

(57) ABSTRACT

Disclosed is an optical information reproducing apparatus that has a light path difference between two lights easily adjusted, has a high effect on the amplification of a signal, and detects an optical information signal of an interfering type. The optical information reproducing apparatus splits a luminous flux emitted from a laser source into a first luminous flux as a signal light and a second luminous flux as a reference light not collected on an optical information recoding medium, makes the signal light optically interfere with the reference light in a state in which the signal light and the reference light are different from each other in a phase relationship to thereby produce interfering lights, and detects the interfering lights.

15 Claims, 28 Drawing Sheets

3
201
141
2
112
141a
$S_{fb}$
111
121
122
101
102
103
131
123
1701
1703
1705
1700
1301
1302
1303
1706
1702
1704

PHOTO DETECTOR
307A, B, C, D
RF2
FES2
1203
1202
1201
203
Sig1
Sig2
Sig11
Sig12
Sig21
Sig22
308a
308b
307a
307b
307c
307d
307A
307B
307C
307D
301
302
303
304
305
306
11
12
102
102a
102b
103
103a
103b
132
133
134
135

DETECTION OPTICS
2
3
101
111
121
131
102
122
112
201
123
141
141a
$S_{fb}$
103
1301
1302
1303
301
102a, 103a
102b, 103b
102c, 103c
302
303
304
305
306
307A
307a
307e
307b
307f
307B
307c
307g
307C
307D
307h
307d

OPTICAL INFORMATION REPRODUCING APPARATUS

CLAIM OF PRIORITY

The present application claims priority from Japanese patent application JP 2011-258428 filed on Nov. 28, 2011, the content of which is hereby incorporated by reference into this application.

FIELD OF THE INVENTION

The present invention relates to an information reproducing apparatus for irradiating an information recording medium with light to thereby reproduce information.

BACKGROUND OF THE INVENTION

In an optical disk, a Blu-ray Disc™ (BD) using a blue-violet semiconductor laser and a high-NA objective lens having a numerical aperture NA of 0.85 has been commercialized and has reached nearly a limit of optical resolution of an optical system. Thus, it is thought that increasing the number of recording layers will be dominant so as to achieve a larger amount of capacity. In recent years, a Blu-ray Disc having two recording layers or three recording layers is offered commercially and is used as a storage medium of a video recorder and a personal computer.

In this multilayer optical disk, detected lights from respective recording layers need to be nearly equal to each other in amount, so that as the number of layers is increased, the reflectivity of each of the recording layers is forced to be small. Hence, this presents a problem that a Signal to Noise ratio (SNR) of a readout signal from each of the recording layers is reduced.

Hence, a technique of amplifying a readout signal has been developed. As an example of the technique, the following technique is described in Japanese Unexamined Patent Publication No. 2008-310942. A weak light (signal light) reflected by an optical disk is mixed with light (reference light) that is split before being applied to the optical disk and is not applied to the optical disk and is amplified by interference. At this time, the mixed light is split into two components by a non-polarizing beam splitter (NPBS) and the components are transmitted through a half wave plate or a quarter wave plate. Then, a differential detection between light transmitted through a polarizing beam splitter (PBS) and light reflected by the polarizing beam splitter is performed, whereby four interfering lights of two split lights which are different from each other in a phase relationship are detected. When the optical disk is rotated, the optical disk fluctuates, which varies a light path length of the signal light, whereby the outputs of four interfering lights are varied. However, by selectively calculating four outputs, a readout signal can be steadily amplified.

SUMMARY OF THE INVENTION

However, in the patent document 1 described above, 16 detectors are required for the readout signal and the focus error signal produced from the interfering light of the signal light and the reference light and having a high Signal to Noise ratio. Hence, this large number of detectors results in reducing a Signal to Noise ratio by the effects of amplifier noise and shot noise.

In view of the problems described above, an object of the present invention is to prove an optical information reproducing apparatus that has a light path difference between two lights easily adjusted, has a high effect on the amplification of a signal, and detects an optical information signal of an interfering type.

In order to solve the problems described above, the optical information reproducing apparatus according to the present invention splits a luminous flux emitted from a laser source into a first luminous flux as a signal light and a second luminous flux as a reference light not collected on an optical information recoding medium, makes the signal light optically interfere with the reference light in a state in which the signal light and the reference light are different from each other in a phase relationship to thereby produce interfering lights, and detects the interfering lights, The first luminous flux or the second luminous flux is defocused in front or behind to thereby produce interfering lights and a focus error signal is acquired from a difference signal between the interfering lights.

(1) More specifically, the information reproducing apparatus: splits a luminous flux emitted from a laser source into a first luminous flux and a second luminous flux; makes the first luminous flux collected on and reflected by an optical information recording medium a signal light and guides the signal light to a first detector and a second detector; makes the second luminous flux not collected on the optical information recording medium a reference light and guides the reference light to the first detector and the second detector; and makes the signal light optically interfere with the reference light on the first detector and the second detector, respectively, in a state in which a phase relationship between the signal light and the reference light is different from each other to thereby produce interfering lights; and detects the interfering lights.

The second luminous flux is a luminous flux defocused in front and behind with respect to the first luminous flux focused on a predetermined layer of the optical information recording medium.

An interfering light of the first luminous flux and the second luminous flux defocused in front is detected by the first detector and a signal Sig1 is produced from an output of the first detector.

An interfering light of the first luminous flux and the second luminous flux defocused behind is detected by the second detector and a signal Sig2 is produced from an output of the second detector.

A RF signal is acquired from a sum of the signal Sig1 and the signal Sig2.

A focus error signal is acquired from a difference between the signal Sig1 and the signal Sig2.

In this way, in the first detector, when the first luminous flux is defocused in front by a predetermined amount with respect to the predetermined layer of the optical information recording medium, an effect of amplification by the interference of the signal Sig1 becomes maximum. Further, in the second detector, when the first luminous flux is defocused behind by a predetermined amount with respect to the predetermined layer of the optical information recording medium, an effect of amplification by the interference of the signal Sig2 becomes maximum. In other words, from the respective detectors can be acquired the two signals Sig1 and Sig 2 whose outputs become maximum when the first luminous flux is defocused in front and behind by the predetermined amount with respect to the predetermined layer of the optical information recording medium. Hence, by acquiring the sum of these two signals Sig1 and Sig 2, there can be acquired the RF signal whose output becomes maximum when the defocus is zero. Further, by acquiring the difference between these two signals Sig1 and Sig 2, there can be acquired the focus error signal whose output becomes zero when the defocus is zero and whose output is opposite in sign according to a sign of the defocus. In this way, the RF signal and the focus error signal each of which has a high Signal to Noise ratio can be produced at the same time.

(2) Further, as another means of (1), in place of making the second luminous flux a luminous flux defocused in front and behind with respect to the first luminous flux focused on the predetermined layer of the optical information recording medium, the first luminous flux is made a luminous flux defocused in front and behind with respect to the second luminous flux focused on the first detector and the second detector.

An interfering light of the second luminous flux and the first luminous flux defocused in front is detected by the first detector and the signal Sig1 is produced from an output of the first detector.

An interfering light of the second luminous flux and the first luminous flux defocused behind is detected by the second detector and the signal Sig2 is produced from an output of the second detector.

The RF signal is acquired from a sum of the signal Sig1 and the signal Sig2.

The focus error signal is acquired from a difference between the signal Sig1 and the signal Sig2.

In this way, in the first detector, when the first luminous flux is defocused behind by the predetermined amount with respect to the predetermined layer of the optical information recording medium, an effect of amplification by the interference of the signal Sig1 becomes maximum. Further, in the second detector, when the first luminous flux is defocused in front by the predetermined amount with respect to the predetermined layer of the optical information recording medium, an effect of amplification by the interference of the signal Sig2 becomes maximum. In other words, from the respective detectors, there can be acquired two signals Sig1 and Sig 2 whose outputs become maximum when the first luminous flux is defocused in front and behind by the predetermined amount with respect to the predetermined layer of the optical information recording medium. Hence, by acquiring the sum of these two signals Sig1 and Sig 2, there can be acquired the RF signal whose output becomes maximum when the defocus is zero. Further, by acquiring the difference between these two signals Sig1 and Sig 2, there can be acquired the focus error signal whose output becomes zero when the defocus is zero and whose output is opposite in sign according to a sign of the defocus. In this way, the RF signal and the focus error signal each of which has a high Signal to Noise ratio can be produced at the same time.

(3) Further, as another means of (1) is provided the information reproducing apparatus that splits the luminous flux emitted from the laser source into the first luminous flux and the second luminous flux, makes the first luminous flux collected on and reflected by the optical information recording medium the signal light and guides the signal light to the first detector, the second detector, and a third detector, makes the second luminous flux not collected on the optical information recording medium the reference light and guides the reference light to the first detector, the second detector, and the third detector, and makes the signal light optically interfere with the reference light on the first detector, the second detector, and the third detector, respectively, in a state in which a phase relationship between the signal light and the reference light is different from each other to produce thereby interfering lights, and detects the interfering lights.

The second luminous flux is a luminous flux defocused in front and behind with respect to the first luminous flux focused on a predetermined layer of the optical information recording medium and a luminous flux not defocused.

An interfering light of the first luminous flux and the second luminous flux not defocused is detected by the third detector and the RF signal is acquired from an output Sig3 of the third detector.

Further, an interfering light of the first luminous flux and the second luminous flux defocused in front is detected by the first detector and the signal Sig1 is produced from an output of the first detector.

An interfering light of the first luminous flux and the second luminous flux defocused behind is detected by the second detector and the signal Sig2 is produced from an output of the second detector.

The focus error signal is acquired from the difference between the signal Sig1 and the signal Sig2.

In this way, by detecting the RF signal and the focus error signal separately, when the first luminous flux is focused on the predetermined layer of the optical information recording medium, the most effective amplification can be acquired for the RF signal and for the focus error signal (FES), FES pull-in range can be suitably designed by an amount of defocus given to the second luminous flux.

(4) Further, as another means of (3), in place of making the second luminous flux a luminous flux defocused in front and behind with respect to the first luminous flux focused on the predetermined layer of the optical information recording medium and a luminous flux not defocused, the first luminous flux is made a luminous flux defocused in front and behind with respect to the second luminous flux focused on the first detector, the second detector, and the third detector and a luminous flux not defocused.

An interfering light of the second luminous flux and the first luminous flux not defocused is detected by the third detector and the RF signal is acquired form an output Sig3 of the first detector.

Further, an interfering light of the second luminous flux and the first luminous flux defocused in front is detected by the first detector and the signal Sig1 is produced from an output of the second detector.

An interfering light of the second luminous flux and the first luminous flux defocused behind is detected by the second detector and the signal Sig2 is produced from an output of the third detector.

The focus error signal is acquired from the difference between the signal Sig1 and the signal Sig2.

In this way, by detecting the RF signal and the focus error signal separately, when the first luminous flux is focused on the predetermined layer of the optical information recording medium, the most effective amplification can be acquired for the RF signal and a defocus range to be pulled in by an amount of defocus given to the first luminous flux can be suitably designed for the focus error signal.

(5) Still further, as another means of (1) is provided the optical information reproducing apparatus in which: the signal light of the first luminous flux is split into a first signal light and a second signal light;

the reference light of the second luminous flux is split into a first reference light and a second reference light;

an interfering light of the first signal light and the first reference light is detected by the first detector;

an interfering light of the second signal light and the second reference light is detected by the second detector; and a RF signal is acquired from an output of the first detector.

Further, the optical information reproducing apparatus has a defocusing means disposed in a light path of the second reference light, the defocusing means defocusing the second reference light in front and behind. The defocusing means defocuses the second reference light in front or behind with respect to the second signal light focused on the predetermined layer of the optical information recording medium at time t or at time (t+Δt). A focus error signal is acquired from a difference between an output Sig2(*t*) of the second detector at the time t and an output Sig2(*t*+Δt) of the second detector at the time (t+Δt).

In this way, by detecting the RF signal and the focus error signal separately, when the first luminous flux is focused on the predetermined layer of the optical information recording medium, the most effective amplification can be acquired for the RF signal and a defocus range to be pulled in by an amount of defocus given to the second luminous flux can be suitably designed for the focus error signal.

(6) Still further, as another means of (5) is provided the optical information reproducing apparatus in which:

the signal light of the first luminous flux is split into a first signal light and a second signal light;

the reference light of the second luminous flux is split into a first reference light and a second reference light;

an interfering light of the first signal light and the first reference light is detected by the first detector;

an interfering light of the second signal light and the second reference light is detected by the second detector; and a RF signal is acquired from an output of the first detector.

Further, the optical information reproducing apparatus has a defocusing means disposed in a light path of the second signal light, the defocusing means defocusing the second signal light in front and behind. The defocusing means defocuses the second signal light in front or behind with respect to the second reference light focused on the second detector at time t or at time (t+Δt). A focus error signal is acquired from a difference between an output Sig2(*t*) of the second detector at the time t and an output Sig2 (t+Δt) of the second detector at the time (t+Δt).

In this way, by detecting the RF signal and the focus error signal separately, when the first luminous flux is focused on the predetermined layer of the optical information recording medium, the most effective amplification can be acquired for the RF signal and for the focus error signal (FES), FES pull-in range can be suitably designed by an amount of defocus given to the second luminous flux.

(7) Each of the first, second, and third detectors includes four detectors (PD1, PD2, PD3, PD4; PD1A, PD2A, PD3A, PD4A; PD1B, PD2B, PD3B, PD4B). Phase relationships between the signal light and the reference light are different from each other by about 90 degrees on the four detectors of the first, second, and third detectors. A difference between interfering lights of the signal light and the reference light is detected on each pair of detectors in which phases are different from each other by about 180 degrees (PD1 and PD2, PD3 and PD4, PD1A and PD2A, PD3A and PD4A, PD1B and PD2B, PD3B and PD4B). In this way, two sets of difference signals Sig11 and Sig12, Sig21 and Sig22, Sig31 and Sig32 are produced.

In this way, of a phase relationship of 360 degrees, four phase states shifted by about 90 degrees can be detected at the same time by the four detectors of each of the first, second, and third detectors. The readout signal is varied sinusoidally according to a change of 360 degrees in the phase state of the light, so that by observing four signals shifted by 90 degrees in phase state, the state of the signal in an arbitrary phase state can be reproduced by calculation. In other words, the signal can be reproduced and detected steadily in an arbitrary phase state.

Here, the phase state is shifted by about 90 degrees in the above description, but by observing three signals which are shifted by about 120 degrees respectively, for example, by 0 degrees, 120 degrees, and 240 degrees, the signal can be reproduced and detected steadily.

(8) In (7), the two sets of difference signals Sig11 and Sig12, Sig11 and Sig22, Sig31 and Sig32 acquired by four detectors of each of the first, second, and third detectors are detected by detecting a pair of interfering lights which are different from each other by about 180 degrees by a differential detector of a current differential type.

In this way, it is possible to prevent each of the detectors from being saturated by the intensity of the reference light. Hence, a sufficient amplification effect can be acquired and a sufficient Signal to Noise ratio can be ensured.

(9) Further, a sum single Sig1 is acquired by adding the square of the difference signal Sig11 to the square of the difference signal Sig12, the difference signal Sig11 and the difference signal Sig12 being acquired by the four detectors of the first detector in (7) or (8).

Further, a sum single Sig2 is acquired by adding the square of the difference signal Sig21 to the square of the difference signal Sig22, the difference signal Sig21 and the difference signal Sig22 being acquired by the four detectors of the second detector.

Further, a sum single Sig3 is acquired by adding the square of the difference signal Sig31 to the square of the difference signal Sig32, the difference signal Sig31 and the difference signal Sig32 being acquired by the four detectors of the third detector.

In this way, the phases are shifted by about 90 degrees in the four detectors, so that if Sig 11 or Sig21 or Sig31 is sine for the phase relationship between the signal light and reference light, Sig 12 or Sig22 or Sig32 becomes cosine. Hence, by calculating the sum of the square of one of a pair of difference signals (ex. Sig11) and the square of the other of the pair (ex. Sig12), a constant maximum output signal can be always acquired.

(10) The defocusing unit to defocus the first luminous flux or the second luminous flux in front or behind is a curvilinear diffraction grating. The curvilinear diffraction grating is a diffraction grating made by cutting a so-called Fresnel zone plate, in which gratings are arranged concentrically with their pitches made finer toward its periphery, at a position shifted from its center, and can give diffracted light a lens operation as an effect of the Fresnel zone plate. In this lens operation, + first order diffracted light and − first order diffracted light are opposite to each other in direction. When a convex lens operation is applied to the + first order diffracted light, a concave lens operation is applied to the − first order diffracted light. On the contrary, when a concave lens operation is applied to the + first order diffracted light, a convex lens operation is applied to the − first order diffracted light.

In this way, a luminous flux defocused in front and behind, that is, in opposite directions with respect to the first luminous flux or the second luminous flux by an equal amount can be formed with good controllability.

(11) It is desired that the in front/behind defocus wavefront aberrations given to the first luminous flux or the second luminous flux are opposite to each other in sign and are nearly equal to each other in absolute value. At this time, when a signal acquired from the detector for detecting the interfering light of the first or second luminous flux and the second or first luminous flux defocused in front is made Sig1 and a signal acquired from the detector for detecting the interfering light of the first or second luminous flux and the second or first luminous flux defocused behind is made Sig2, the RF signal can be acquired as (Sig1+Sig2) and the focus error signal can be acquired as (Sig1−Sig2) or (Sig2−Sig1).

In this way, the RF signal and the focus error signal each of which has a high Signal to Noise ratio can be produced at the same time.

(12) The in front/behind defocus wavefront aberrations given to the first luminous flux or the second luminous flux may be different in absolute value. At this time, when a signal acquired from the detector for detecting the interfering light of the first or second luminous flux and the second or first luminous flux defocused in front is made Sig1 and a signal acquired from the detector for detecting the interfering light of the first or second luminous flux and the second or first luminous flux defocused behind is made Sig2 and these signals Sig1 and Sig2 are multiplied by coefficients respectively, the RF signal can be acquired as ($a_1$ Sig1+$a_2$ Sig2) and the focus error signal can be acquired as ($b_1$ Sig1−$b_2$ Sig2) or (Sig2−Sig1), where $a_1$, $a_2$, $b_1$, and $b_2$ are predetermined coefficients.

In this way, the RF signal and the focus error signal each of which has a high Signal to Noise ratio can be produced at the same time.

(13) A unit to adjust an optical phase difference (light path length difference) between the signal light and the reference light is disposed in a light path of the reference light.

In this way, the phase difference between the signal light and the reference light can be always made smaller than a coherence length of the laser source. For example, in the case where the coherence length is 100 μm, when a light path length difference is controlled to 100 μm or less, the interference of the signal light and the reference light can be reliably ensured and hence an effect of amplification of the optical signal by the interference can be steadily acquired.

(14) Further, an optical information reproducing apparatus according to the present invention includes:

a laser source;

a first optical splitting element for splitting a luminous flux emitted from the laser source;

a collecting optical system for collecting one of luminous fluxes, into which the luminous flux emitted from the laser light is split by the first optical splitting element, on an optical information recording medium;

a variable focusing mechanism for varying a focal position of light collected in the collecting optical system;

a first detector for detecting a signal light collected on and reflected by the optical information recording medium;

an interfering optical system for making a signal light collected on and reflected by the optical information recording medium optically interfere with a reference light acquired from other of the split luminous fluxes;

a splitting optical system for splitting an interfering light in the interfering optical system into a plurality of interfering lights;

a plurality of second detectors each of which detects each of the plurality of interfering lights split by the splitting optical system in a state in which the plurality of interfering lights are different from each other in a phase relationship; and a switching unit to switch between a focus error signal acquired from a signal light detected by the first detector and a focus error signal acquired from an interfering light detected by the plurality of second detectors, the switching means switching between the focus error signals to thereby control the variable focusing mechanism.

There can be realized an interfering type optical information detection method, an optical pickup, and an optical disk apparatus which can be made in the same size as a conventional optical disk apparatus and produces a high effect on the amplification of a signal and is inexpensive. In particular, a readout signal having a high Signal to Noise Ratio can be acquired for a multilayer optical disk having a plurality of recording layers. Specifically, in the prior art (patent document 1), 16 detectors are required for a readout signal and a focus error signal each of which is produced from an interfering light of a signal light and a reference light and has a high Signal to Noise Ratio, whereas according to the present invention, two or three sets of N detectors (N is three or more) are required and hence 6 detectors (when the number of sets is two and N=3) to 12 detectors (when the number of sets is three and N=4) can be reduced.

In particular, an optical information signal having a high Signal to Noise ratio can be detected for a multilayer optical disk having a plurality of recording layers.

DETAILED DESCRIPTION OF THE PREFERRED EMBODIMENTS

Hereinafter, embodiments of the present invention will be described with reference to the drawings.

First Embodiment

In a first embodiment will be described an example of giving reference lights defocuses which are opposite in sign.

[Construction of Optical Pickup Optical System]

Figure 1:
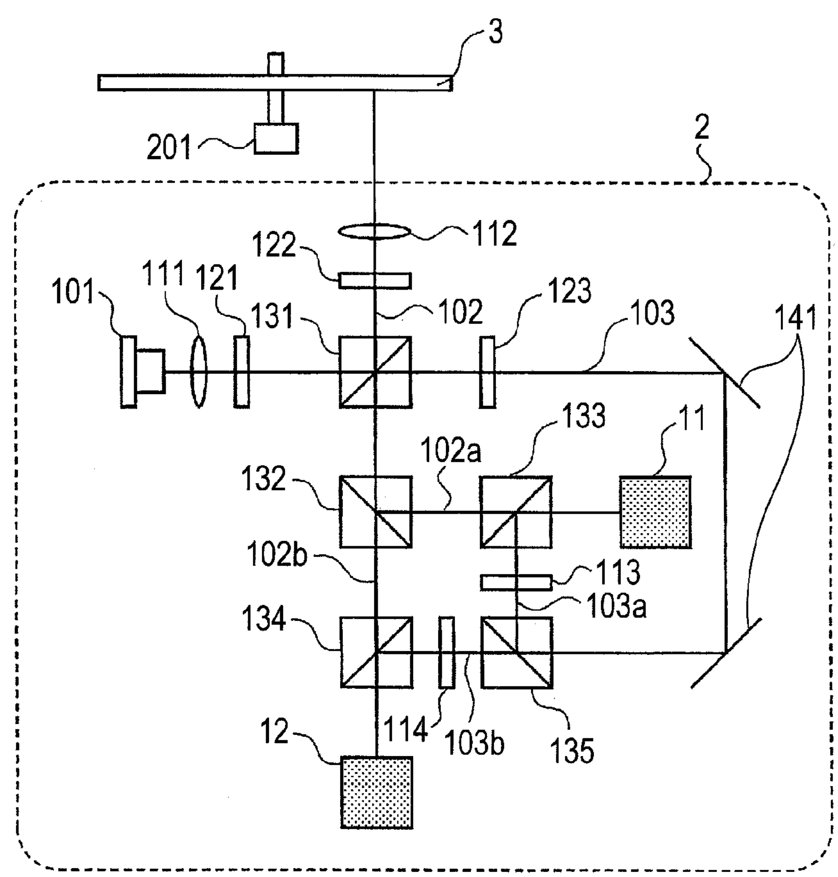
FIG. 1 is a diagram to show a construction example of an optical pickup for realizing an optical information detection method according to the present invention.

FIG. 1 shows a general construction of an optical system of an optical pickup 2 for realizing an optical signal detection method according to the present invention. An optical pickup optical system of the present embodiment is constructed of an interference optical system and a detection optics. The interference optical system guides light emitted from a semiconductor laser to an optical disk and makes the optical disk reflect the light and makes the reflected light (signal light) interfere with a reference light to produce an interfering light. The detection optics splits the produced interfering light and gives each of the split interfering lights a phase difference and detects the split interfering lights by a plurality of detectors.

<Production of Signal Light and Reference Light>

Light emitted from a semiconductor laser 101 is made into a collimated light by a collimator lens 111 and is transmitted through a half wave plate 121 and is incident on a polarizing beam splitter 131 and is split into a first luminous flux 102 and a second luminous flux 103. The polarizing beam splitter 131 has a function of transmitting nearly 100% of p polarized light (hereinafter referred to as "parallel polarized light") incident on a splitting surface thereof and of reflecting nearly 100% of s polarized light (hereinafter referred to as "perpendicular polarized light"). A polarization state of the light emitted from the semiconductor laser 101 is p polarized light. By adjusting a rotation angle around an optical axis of the half wave plate 121, a polarization direction of the light transmitted through the halve wave plate 121 can be arbitrarily changed and an intensity ratio of the transmitted light to the reflected light by the polarizing beam splitter 131 can be arbitrarily adjusted.

<Detection of Splitting of Signal Light into Two Components>

The first luminous flux 102 of the perpendicular polarized light reflected by the polarizing beam splitter 131 is transmitted through a quarter wave plate 122, thereby being converted into circularly polarized light. Then, the circularly polarized light is collected by an objective lens 112 and is applied to an optical disk 3 having one or a plurality of information recording layers. The first luminous flux 102 (hereinafter referred to as "signal light") reflected by the optical disk 3 rotated by a rotary motor 201 is returned again to a collimated light by the objective lens 112 and is returned to a linearly polarized light by the quarter wave plate 122. However, the rotation direction of the circularly polarized light is reversed by reflection on a surface of the optical disk 3 and hence a direction of the linearly polarized light becomes a parallel polarized light perpendicular to the original light. For this reason, the signal light 102 of the parallel polarized light transmitted through the quarter wave plate 122 is transmitted through the polarizing beam splitter 131 and travels toward a beam splitter 132 of a half mirror.

The signal light 102 incident on the beam splitter 132 is split into a first signal light 102*a* and a second signal light 102*b*. The first signal light 102*a* reflected by the beam splitter 132 is transmitted through a polarizing beam splitter 133 and travels toward a detection optics 11. Further, the second signal light 102*b* transmitted through the beam splitter 132 is transmitted through a polarizing beam splitter 134 and travels toward a detection optics 12.

<Detection of Splitting of Defocus Reference Light into Two Components>

On the other hand, the second luminous flux 103 (hereinafter referred to as "reference light") transmitted through the half wave plate 121 and the polarizing beam splitter 131 is converted into perpendicular polarized light by a half wave plate 123 and then is reflected by a reference light reflection means 141 and travels toward a beam splitter 135 of a half mirror.

The reference light 103 incident on the beam splitter 135 is split into a first reference light 103*a* and a second reference light 103*b*. The first reference light 103*a* reflected by the beam splitter 135 is transmitted through a first lens 113, thereby being given a predetermined defocus wavefront aberration $W_{20}$, and then is reflected by a polarizing beam splitter 133 and travels toward the detection optics 11. Further, the second reference light 103*b* transmitted through the beam splitter 135 is transmitted through a second lens 114, thereby being given a defocus wavefront aberration $-W_{20}$ which has a sign opposite to a sign given to the first reference light 103*a* by the first lens 113, and then is reflected by a polarizing beam splitter 134 and travels toward the detection optics 12.

At this time, the first reference light 102*a* and the first reference light 103*a* are mixed by the detection optics 11 in the state where their polarization directions are perpendicular to each other, that is, the signal light is the parallel polarized light and the reference light is the perpendicular polarized light. Similarly, the second reference light 102*b* and the second reference light 103*b* are mixed by the detection optics 12 in the state where their polarization directions are perpendicular to each other, that is, the signal light is the parallel polarized light and the reference light is the perpendicular polarized light.

<Specification of Amount of Defocus>

It is desired that an absolute value of the defocus wavefront aberration given to the first reference light 103*a* by the first lens 113 is nearly equal to an absolute value of the defocus wavefront aberration given to the second reference light 103*b* by the second lens 114. Alternatively, it is desired that in regard to the signal light 102 reflected by the optical disk 3 and traveling toward the detection optics 11, 12, the first reference light 103*a* and the second reference light 103*b* are given defocus wavefront aberration $+W_{20}r^2$, $-W_{20}r^2$, respectively, where a normalized radius of a luminous flux is r (r=0 for an optical axis, r=1 for a peripheral luminous flux), and are defocused in front and behind the signal light 102. For example, the first lens 113 is made a convex lens having a focal length $f_0$ and the second lens 114 is made a concave lens having a focal length $-f_0$.

[General Construction of Optical Information Recoding/Reproducing Apparatus]

Figure 2:
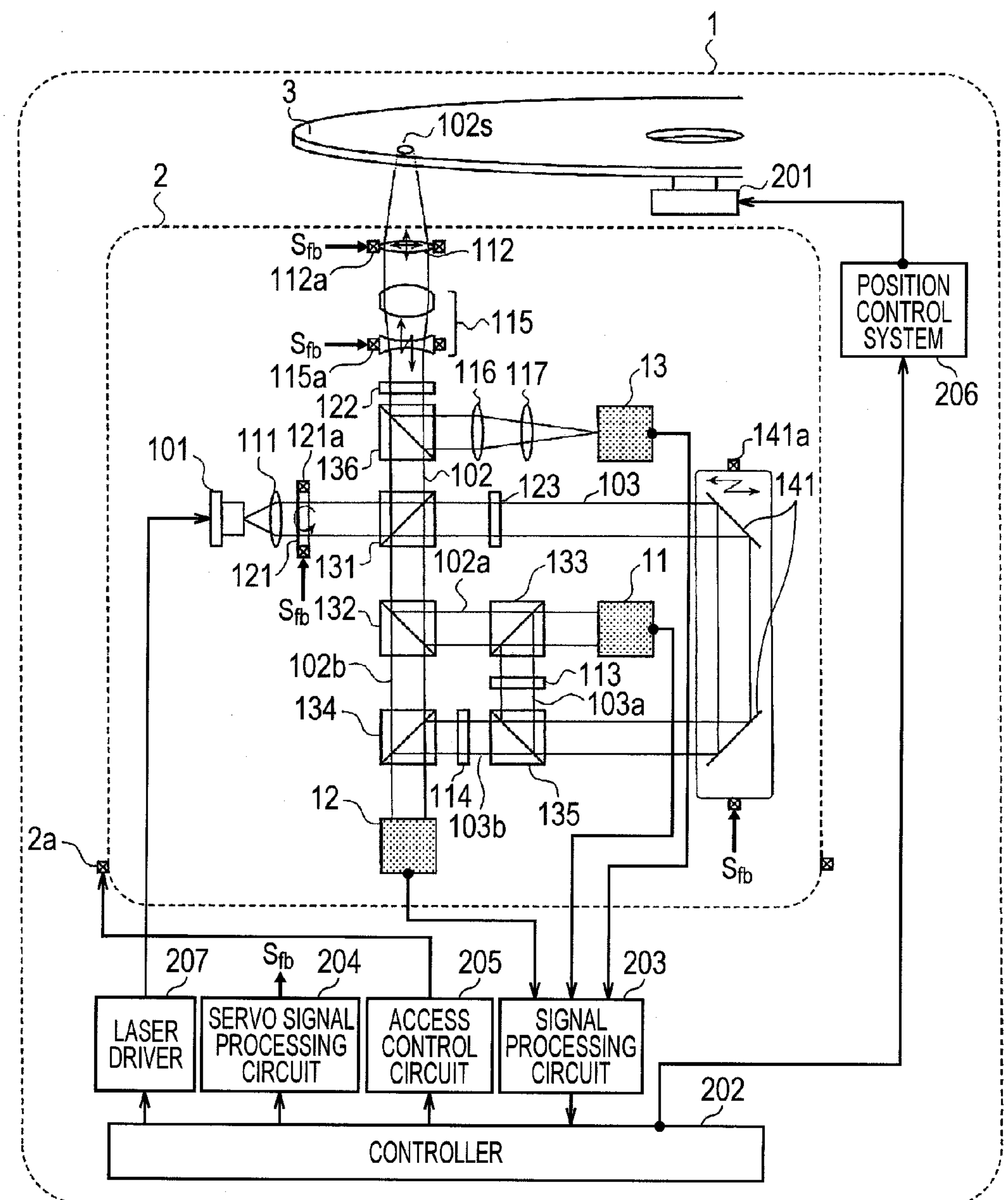
FIG. 2 is a schematic diagram to show a construction example of an optical information recoding and reproducing apparatus according to the present invention.

FIG. 2 is an example of a general construction of an optical information recoding and reproducing apparatus for realizing an optical signal detection method according to the present invention.

<General Construction of Drive and Control Mechanism>

An optical information recoding and reproducing apparatus 1 is provided with an optical pickup 2 and a rotary motor 201 and an optical disk 3 can be rotated by the rotary motor 201.

The optical pickup 2 performs a role of recording and/or reproducing digital information by irradiating the optical disk 3 with light. A reproducing light detected by the optical pickup 2 is converted to electric current/voltage (IV) and then is inputted to a signal processing circuit 203. A readout signal and a servo signal are produced by the signal processing circuit 203 and are sent to a controller 202. The controller 202 controls a servo control circuit 204, an access control circuit 205, and a position control system 206 on the basis of the servo signal. The servo control circuit 204 performs the position control of an objective lens and a beam expander of the optical pickup 2, which will be described later. The access control circuit 205 performs the position control of the optical pickup 2 by an actuator 2*a*. The position control system 206 performs a rotation control of the optical disk 3 by the rotary motor 201. In this way, an optical spot 102*s* is positioned at an arbitrary position of the optical disk 3. Further, the controller 202 controls a laser driver 207 according to a reproducing operation of a recording operation and to a kind of the disk to make a semiconductor laser 101 included by the optical pickup 2 emit light having a suitable power and waveform. Still further, as will be described later, at the time of the recording operation, the signal light 102 of the optical pickup 2 needs a large amount of light, whereas at the time of the reproducing operation, an amplification factor of the reproducing light is determined by the amount of light of the reference light. Hence, at the time of the recording operation and at the time of reproducing operation, a rotary actuator 121*a* is controlled by the servo control circuit 204 to suitably adjust a rotation angle around an optical axis of the half wave plate 121.

<Production Of Signal Light and Reference Light>

Light emitted from a blue-violet semiconductor laser 101 set on the optical pickup 2 and having a wavelength of 405 nm is collimated by a collimating lens 111 and is transmitted through the half wave plate 121 and is split into the first luminous flux 102 and the second luminous flux 103 by the polarizing beam splitter 131.

The first luminous flux 102 of the perpendicular polarized light reflected by the polarizing beam splitter 131 is transmitted through a polarizing beam splitter 136 and is transmitted through the quarter wave plate 122, thereby being converted into a circularly polarized light. Then, the circularly polarized light is transmitted through a beam expander 115 for correcting wavefront aberration developed by a change in the thickness of a substrate of the optical disk 3 having one or a plurality of information recording layers and is collected by the objective lens 112 having a numerical aperture NA of 0.85 and is applied to the optical disk 3. The signal light reflected by the optical disk 3 is transmitted through the objective lens 112, the beam expander 115 and the quarter wave plate 122, thereby being made into a parallel polarized light.

The beam splitter 136 is designed in such a way as to have a property of transmitting 100% of perpendicular polarized light and of reflecting a part of parallel polarized light and transmitting a part of parallel polarized light, so that a part of signal light is reflected by the beam splitter 136 and the remainder is transmitted.

<Detection of Signal Light>

The part of signal light 102 reflected by the beam splitter 136 is collected by a collective lens 116 and is given astigmatism by a cylindrical lens 117 and is guided to a detector 13. From an output signal of the detector 13, a servo signal of a focus error signal (FES) and a tracking error signal (TES) and a RF signal are outputted by the signal processing circuit 203. On the basis of the servo signal and/or a focus error signal produced by the signal processing circuit 203 from an output signal of detection optics 11, 12, which will be described later, the controller 202 controls a lens actuator 115*a* and an objective lens actuator 112*a* via the servo control circuit 204 to thereby position the optical spot 102*s* at an arbitrary position of the optical disk 3. The lens actuator 115*a* changes a position in an optical axis direction of the beam expander 115 and the objective lens actuator 112*a* changes a position in an optical axis direction and in an optical disk radius direction of the objective lens 112.

<Detection of Signal Light and Reference Light>

The remainder of the signal light 102 transmitted through the beam splitter 136, as described above, is transmitted through the polarizing beam splitter 131 and is split into the first signal light 102*a* and the second signal light 102*b* by the beam splitter 132. Then, the first signal light 102*a* and the second signal light 102*b* travel toward the detection optics 11 and the detection optics 12 respectively in the state of parallel polarized light. On the other hand, the second luminous flux 103 (hereinafter referred to as "reference light") of the parallel polarized light transmitted through the half wave plate 121 and the polarizing beam splitter 131, as described above, is converted into the perpendicular polarized light by the half wave plate 123. Then, the perpendicular polarized light is reflected by the reference light reflection means 141 and is split into the first reference light 103*a* and the second reference light 103*b* by the beam splitter 135. The first reference light 103*a* and the second reference light 103*b* are given predetermined defocuses by the first lens 113 and the second lens 114, respectively, and then travel toward the detection optics 11 and the detection optics 12 respectively in the state of perpendicular polarized light. The first signal light 102*a* and the first reference light 103*a* are mixed by the detection optics 11 in a state where their polarization directions are perpendicular to each other. The second signal light 102*b* and the second reference light 103*b* are mixed by the detection optics 12 in a state where their polarization directions are perpendicular to each other. Specifically, as will be described later, the servo signal of the focus error signal (FES) and RF signal are outputted from the output signals of the detection optics 11, 12 by the signal processing circuit 203.

Hereinafter, in order to discriminate the RF signal and the focus error signal, which are acquired from the output signal of the detector 13 and produced from only the signal light 102, from the RF signal and the focus error signal, which are acquired from the detection optics 11, 12 and produced from the interfering light of the signal light 102 and the reference signal 103, which will be described later, the signals acquired from the detector 13 will be described as RF1, FES1, respectively, whereas the signals acquired from the detection optics 11, 12 will be described as RF2, FES2, respectively.

<Control of Device 141*a* to Control Path Length of Reference Light>

Figure 9:
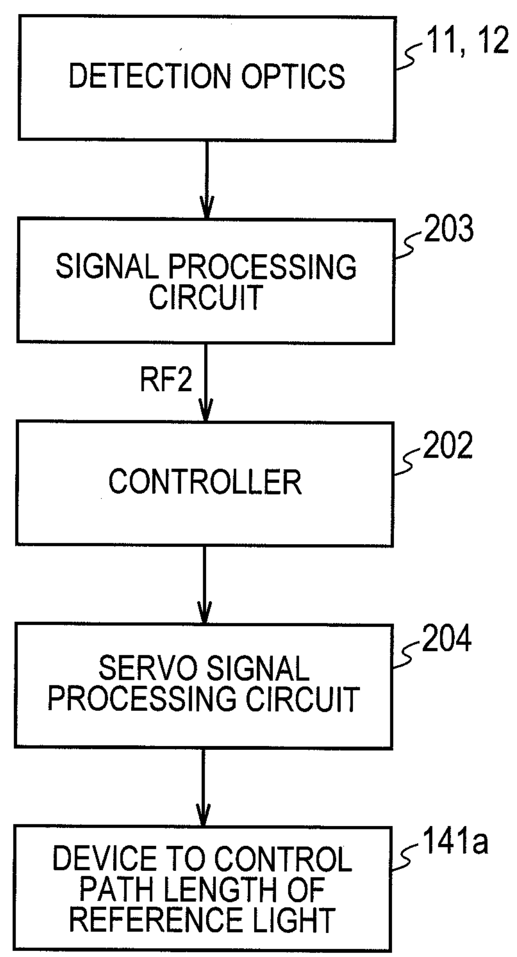
FIG. 9 is a flow chart to show a flow of a device to control path length of reference light according to the present invention.

Here, the controller 202 controls the objective lens actuator 112*a* by the servo control circuit 204 on the basis of the servo signal and at the same time controls a device 141*a* to control path length of reference light to thereby control a position of the reference light reflection means 141 in accordance with a change in the light path length of the signal light responsive to the movement of the objective lens 112 by the device 141*a* to control path length of reference light, thereby making a difference in the light path length between the reference light 103 and the signal light 102 always smaller than a coherence length of the semiconductor laser 101. In this way, the reference light and the signal light are always held in a nearly completely coherent state. Alternatively, as shown in FIG. 9 and will be described later, while monitoring the RF signal RF2, the controller 202 controls the device 141*a* to control path length of reference light in such a way that the degree of interference of the signal light 102 and the reference light 103 becomes maximum. In this way, the signal light 102 can be steadily amplified by the reference light 103.

<Another Example of Rotation of Half Wave Plate 121>

In the present embodiment, the polarization direction of the luminous flux incident on the polarizing beam slitter 131 is controlled by the rotation of the half wave plate 121. Instead of this, for example, by the use of a liquid crystal element plate in which the polarization direction of light is switched when voltage is applied thereto, the polarization direction of the luminous flux may be controlled.

<Another Example of First Luminous Flux and Second Luminous Flux>

In the present embodiment, the light reflected by the beam splitter 131 (perpendicular polarized light) is used as the first luminous flux (signal light) and the light transmitted through the beam splitter 131 (parallel polarized light) is used as the second luminous flux (reference light), but the opposite may be allowed. Even in this case, it is essential only that the polarization direction of the signal light 102 and the polarization direction of the reference light 103 are made perpendicular to each other.

<Another Example of Beam Expander 115>

In the present embodiment has been described the example in which a part of two expander lenses is moved as a spherical aberration correction mechanism. However, instead of this, the collimating lens 111 set on an actuator may be moved, or a wavefront may be directly modulated by the use of a liquid crystal variable phase modulation element driven by voltage.

<Another Example of Beam Splitter 136>

The beam splitter 136 may have a property of reflecting 100% of perpendicular polarized light and reflecting a part of parallel polarized light and transmitting a part of parallel polarized light. At this time, the quarter wave plate 122, the beam expander 115, the objective lens 112, and the optical disk 3 are disposed in a reflected light path of the perpendicular polarized light by the beam splitter 136. Further, the collective lens 116, the cylindrical lens 117, and the detector 13 are disposed in a transmitted light path of the beam splitter 136 of the signal light 102 reflected by the optical disk 3.

<Another Example of Servo System>

In the present embodiment, in order to acquire the focus error signal from the signal light 102 reflected by the optical disk 3, the signal light converted into a convergent light by the collective light 116 is given astigmatism by the cylindrical lens 117 and a focus error signal FES1 is acquired by the detector 13 by the use of an astigmatic method. However, for example, a spot size detection method (SSD) or a knife edge method may be used. In this case, the cylindrical lens 117 is not required. Further, in order to acquire a tracking error signal, it is recommended to use a push-pull method and a DPD (Differential Phase Detection) method which are used for an ordinary optical pickup. Still further, an optical disk intensity signal RF 1 can be acquired from the sum of the respective signal outputs which are detected by the detector 13 made of a plurality of light receiving parts and are converted into current/voltage IV.

[Construction of Optical Pickup Detection Optics]

Figure 3:
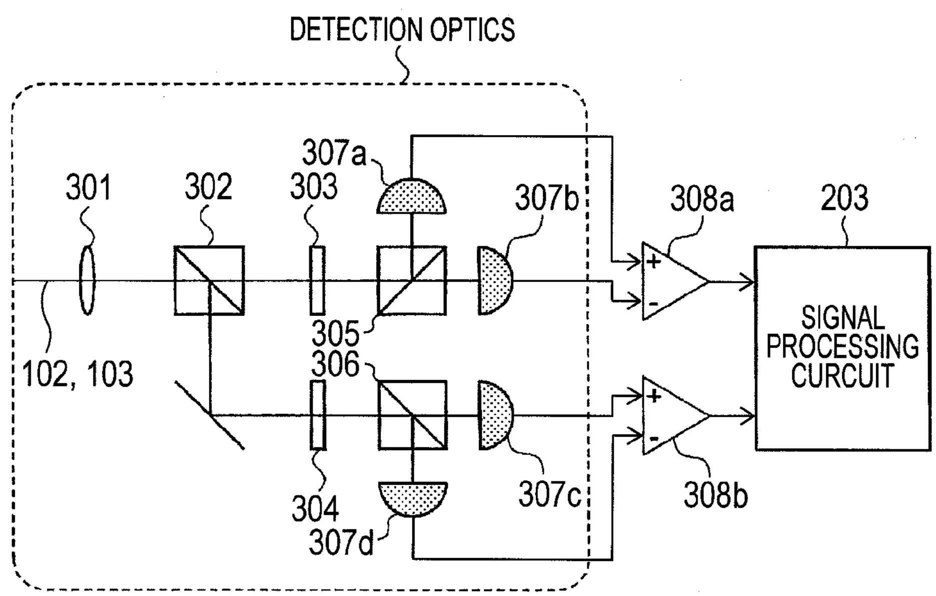
FIG. 3 is a diagram to show a construction example of a detection optics of an optical pickup according to the present invention.

FIG. 3 shows one example of an optical system construction of the detection optics 11 of the optical pickup 2. The construction and the function of the detection optics 12 are the same as this and hence the description of the detection optics 12 will be omitted.

A mixed light of the signal light 102 of the parallel polarized light and the reference light 103 of the perpendicular polarized light, which are incident on the detection optics 11, are collected by a lens 301 and is split into two components by a beam splitter 302 of a half mirror.

<Detection of Mixed Light>

Figure 4:
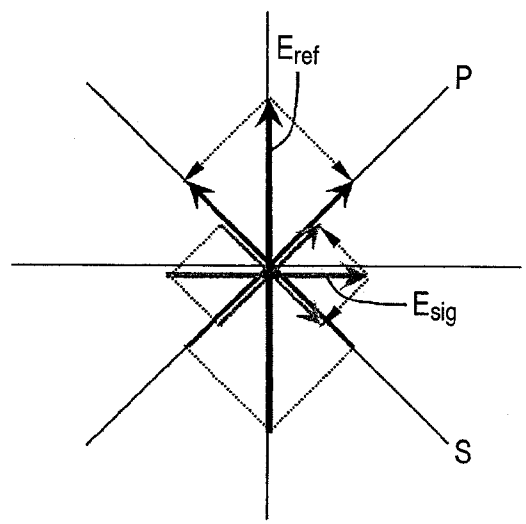
FIG. 4 is a diagram to show polarization directions of a signal light and a reference light and a polarization direction of a detection light.

The mixed light transmitted through a beam splitter 302 has its polarization direction rotated by an angle of 45 degrees by means of a half wave plate 303 and then is split into two linearly polarized lights perpendicular to each other by a polarizing beam splitter 305. The two linearly polarized lights are detected by a first detector 307*a* (PD1) and a second detector 307*b* (PD2, respectively. In the present embodiment, each of the detectors 307*a*, 307*b* is disposed at a focal position of the signal light 102 by a lens 301. Relationships between polarized light components P, S of the light detected by the two detectors PD1, PD2 and the polarization direction (Esig) of the signal light and the polarization direction (Eref) of the reference light are shown in FIG. 4. By the detector PD1 are detected P polarized lights, that is, projected components in a P polarization direction of Esig and Eref. On the other hand, by the detector PD2 are detected S polarized lights, that is, projected components in an S polarization direction of Esig and Eref. In the projected components in the S polarization direction, in the case of this drawing, the sign of Eref is seen reverse. When signals detected by the detectors PD1, PD2 of the detection optics 11 are expressed by formulas, the signals are expressed respectively by the following formulas.

$$I_{PD1} = \left|\frac{1}{2}E_{sig} + \frac{1}{2}E_{ref}\right|^2 = \frac{1}{4}|E_{sig}|^2 + \frac{1}{4}|E_{ref}|^2 + \frac{1}{2}|E_{sig}||E_{ref}|\cos(\varphi_{sig} - \varphi_{ref}) \quad (1)$$

$$I_{PD2} = \left|\frac{1}{2}E_{sig} - \frac{1}{2}E_{ref}\right|^2 = \frac{1}{4}|E_{sig}|^2 + \frac{1}{4}|E_{ref}|^2 - \frac{1}{2}|E_{sig}||E_{ref}|\cos(\varphi_{sig} - \varphi_{ref}) \quad (2)$$

Here, the reason why the absolute values are squared is that it is the energy of light that is detected. Here, for the sake of ease, it is supposed that Esig and Eref are completely coherent to each other.

<Detection of Another Mixed Light>

The mixed light reflected by the beam splitter 302 is converted into a circularly polarized light by a quarter wave plate 304. At this time, the signal light 102 and the reference light 103 are different from each other in the original polarization direction by an angle of 90 degrees, so that they are converted into circularly polarized lights in opposite rotation directions. These circularly polarized lights are split into linearly polarized lights perpendicular to each other by a polarizing beam splitter 306 and the linearly polarized lights are detected by a third detector 307*c* (PD3) and a fourth detector 307*d* (PD4). In the present embodiment, each of the detectors 307*c*, 307*d* is disposed at a focal position of the signal light 102 by the lens 301. Relationships between polarized light components P, S detected by the two detectors PD3, PD4 and the polarization direction (Esig) of the signal light and the polarization direction (Eref) of the reference light are also shown similarly in FIG. 4, but there is a phase difference of 90 degrees between Esig and Eref, which is different from the cases of PD1 and PD2. When signals detected by the detectors PD3, PD4 of the detection optics 11 are expressed by formulas, the signals are expressed respectively by the following formulas.

$$I_{PD3} = \left|\frac{1}{2}\exp\left(-i\frac{\pi}{4}\right)E_{sig} + \frac{1}{2}\exp\left(+i\frac{\pi}{4}\right)E_{ref}\right|^2 = \frac{1}{4}|E_{sig}|^2 + \frac{1}{4}|E_{ref}|^2 + \frac{1}{2}|E_{sig}||E_{ref}|\sin(\varphi_{sig} - \varphi_{ref}) \quad (3)$$

$$I_{PD4} = \left|\frac{1}{2}\exp\left(+i\frac{\pi}{4}\right)E_{sig} + \frac{1}{2}\exp\left(-i\frac{\pi}{4}\right)E_{ref}\right|^2 = \frac{1}{4}|E_{sig}|^2 + \frac{1}{4}|E_{ref}|^2 - \frac{1}{2}|E_{sig}||E_{ref}|\sin(\varphi_{sig} - \varphi_{ref}) \quad (4)$$

Exp ($\pm i\pi/4$) in the formula expresses that there is a phase difference of an angle of ±45 degrees (an angle of 90 degrees) between Esig and Eref. The phase differences between the signal light 102 and the reference light 103 split by the beam splitter 302 and the polarizing beam splitters 305, 306, as shown by formulas (1) to (4), are different from each other by 0°, 180°, 90°, and 270° on the four detectors PD1, PD2, PD3, and PD4 of the detection optics 11.

<Detection of Difference of Signal>

In this way, the signals detected by the respective detectors contain the component $|Eref|^2$ that is not related to information on the optical disk 3. Hence, when a difference signal between the outputs of the PD1 and the PD2 and a difference signal between the outputs of the PD3 and the PD4 are found by differential circuits 308*a* 308*b* of the detection optics 11, they are expressed by the following formulas, $$Sig11 = I_{PD1} - I_{PD2} = |E_{sig}||E_{ref}|\cos(\phi_{sig} - \phi_{ref}) \quad (5)$$

$$Sig12 = I_{PD3} - I_{PD4} = |E_{sig}||E_{ref}|\cos(\phi_{sig} - \phi_{ref}) \quad (6)$$

In this way, a signal expressed by the product of an amplitude intensity of the signal light and an amplitude intensity of the reference light can be acquired. This formula shows the fact that when the intensity of the reference light is made larger, a larger signal output can be acquired. In other words, this formula shows the fact that the intensity of the signal light can be amplified.

In this way, the difference signals Sig11 and Sig12 produced by the detection optics 11 are inputted to the signal processing circuit 203. The servo signal of the focus error signal (FES) and the RF signal are produced, as will be described later, and are sent to the controller 202.

<Production of Two Sets of Sum-of-Squares Signals>

Here, the formula (5) includes cosine and the formula (6) includes sine, which expresses a phase difference between the signal light and the reference light. However, the reference light and the signal light pass different light paths and the objective lens 112 is moved up and down to follow by a focus servo in response to the rotation of the optical disk 3, which results in incessantly changing the light path length of the signal light. Thus, the phase terms of the formula (5) and the formula (6) are not determined and hence a signal acquired by this method will be greatly changed.

Hence, it is determined that the sum of squares of the difference signals Sig11 and Sig12 produced by the detection optics 11 is calculated by the signal processing circuit 203 to thereby acquire a signal Sig1.

$$Sig1 = (Sig11)^2 + (Sig12)^2 = |E_{sig}|^2|E_{ref}| \quad (7)$$

By performing the calculation in this way, even if the phases of the signal light and the reference light are changed, a constant signal can be acquired steadily and surely. As shown by the formula (7), by calculating the sum of squares, the output Sig1 has a signal proportional to the signal light intensity $|Esig|^2$, so that the RF signal has the same signal waveform as the conventional CD, DVD, and BD. Further, an amplification factor of the RF signal is $|Eref|^2$, and hence it is found that the amplification factor can be increased by increasing the intensity of the reference light. Still further, the RF signal may be made by calculating the sum of squares and then calculating the square root of the sum of squares. When the square root of the sum of squares is calculated, an output proportional to the square root of the intensity of the signal light can acquired, so that the RF signal has the same signal waveform as a conventional magneto-optical (MO) disk.

Also in the detection optics 12 shown in FIG. 1, as in the case of the detection optics 11, two difference signals Sig21, Sig22, as shown by formula (5), are produced by a differential circuit from the respective outputs of four detectors PD1A, PD2A, PD3A, and PD4A (307A, B, C, and D). Further, as shown by formula (7), by calculating the sum of squares, $$Sig2 = (Sig21)^2 + (Sig22)^2 \quad (8)$$

an output Sig2 is acquired.

<Another Example of Production of Two Sets of Signals Sig1, Sig2>

Figure 27:
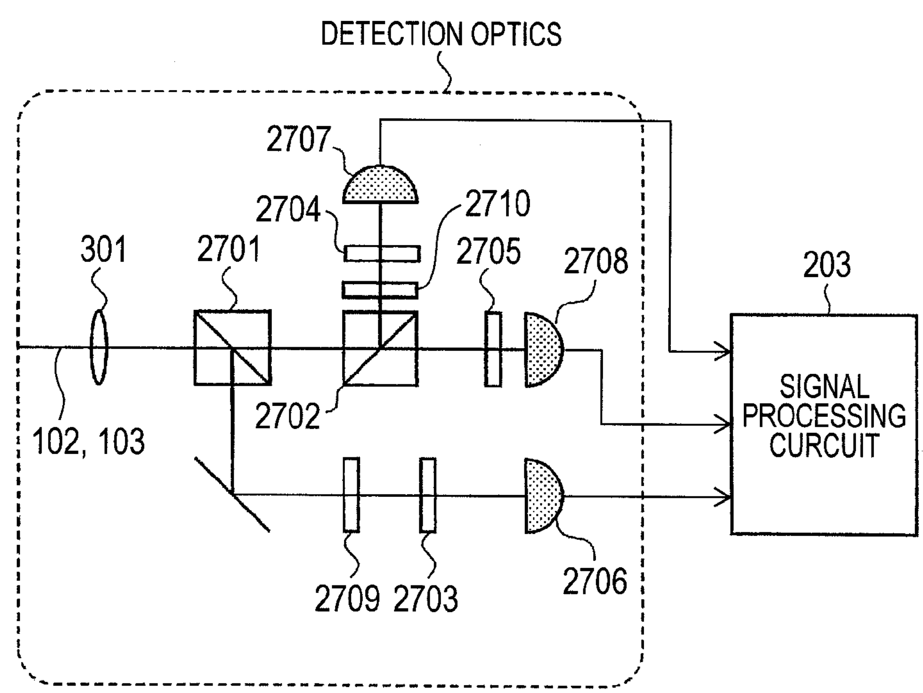
FIG. 27 is a diagram to show another construction example of the detection optics of the optical pickup according to the present invention.

The number of detectors of the detection optics 11, 12 of the optical pickup 2 for acquiring the effects described in the present embodiment and the phase differences between the signal light and the reference light on the respective detectors are not limited to those described above. In principal, it is essential only that phase differences between the signal light and the reference light on the respective detectors are detected by three or more detectors in such a way as to be different from each other. For example, in FIG. 27 will be shown a detection method in the case in which three detectors are used for the detection optics 11 and in which the phase differences between the signal light and the reference light are 0 degree, 120 degrees, and 240 degrees on the respective detectors. The construction and the function of the detection optics 12 are the same as those of the detection optics 11 and hence its description will be omitted.

The mixed light of the signal light 102 of parallel polarized light and the reference light 103 of perpendicular polarized light, which are incident on the detection optics 11, is collected by the lens 301 and is split into three luminous fluxes by non-polarizing beam splitters 2701, 2702. The three luminous fluxes are transmitted through polarizers 2703, 2704, and 2705, each of which transmits light polarized by 45 degrees, and then are detected by detectors 2706, 2707, and 2708. Of these three luminous fluxes, one luminous flux has a phase plate 2709 inserted therein, the phase plate 2709 producing a phase difference of 120 degrees between the signal light and the reference light, and another luminous flux has a phase plate 2710 inserted therein, the phase plate 2710 producing a phase difference of 240 degrees between the signal light and the reference light. Further, in order to make the amounts of light on the respective detectors equal to each other, a non-polarizing beam splitter having a ratio of transmissivity to reflectivity set at 2:1 is used as the non-polarizing beam splitter 2701, and a non-polarizing beam splitter having transmissivity set equal to reflectivity is used as the non-polarizing beam splitter 2702. At this time, the intensities of light incident on the respective detectors are expressed by the following formulas.

$$
\begin{aligned}
I_{PD1} &= \left|\frac{1}{\sqrt{3}}E_{sig} + \frac{1}{\sqrt{3}}E_{ref}\right|^2 \\
&= \frac{1}{3}|E_{sig}|^2 + \frac{1}{3}|E_{ref}|^2 + \frac{2}{3}|E_{sig}||E_{ref}|\cos(\varphi_{sig} - \varphi_{ref} - 0) \\
I_{PD2} &= \left|\frac{1}{\sqrt{3}}E_{sig} + \exp\left(\frac{2}{3}\pi i\right)\frac{1}{\sqrt{3}}E_{ref}\right|^2 \\
&= \frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} - \frac{2}{3}\pi\right) \\
I_{PD3} &= \left|\frac{1}{\sqrt{3}}E_{sig} + \exp\left(-\frac{2}{3}\pi i\right)\frac{1}{\sqrt{3}}E_{ref}\right|^2 \\
&= \frac{1}{3}|E_{sig}|^2 + \frac{1}{3}|E_{ref}|^2 + \frac{2}{3}|E_{sig}||E_{ref}|\cos\left(\varphi_{sig} - \varphi_{ref} + \frac{2}{3}\pi\right)
\end{aligned}
\tag{9}
$$

From these readout signals of lights, an amplified signal Sig1 not depending on the phase difference between the signal light and the reference light can be acquired as shown by the following formulas.

$$
Sig1 = \left(I_{PD1} - \frac{I_{PD2} + I_{PD3}}{2}\right)^2 + 3\left(\frac{I_{PD2} - I_{PD3}}{2}\right)^2 = |E_{sig}|^2|E_{ref}|^2 \tag{10}
$$

<Another Example of Production of Two Sets of Signals Sig1, Sig2>

Further, as another calculation of the signal Sig1 (or Sig2) for acquiring the effects described in the present embodiment, the difference signals Sig1, Sig2 of the formulas (5), (6) may be multiplied by coefficients, respectively, and then the difference signals Sig1, Sig2 multiplied by the coefficients may be added to acquire a signal output. That is, the signal Sig1 may be acquired by the formula (II). The coefficients α, β are found by calculating the formula (12). The signal Sig2 is also found in the same way and hence its description will be omitted.

$$
Sig1 = \alpha \cdot Sig11 + \beta \cdot Sig12 \tag{11}
$$

$$
\alpha = \frac{\overline{Sig11}}{\sqrt{\overline{Sig11}^2 + \overline{Sig12}^2}}, \quad \beta = \frac{\overline{Sig12}}{\sqrt{\overline{Sig11}^2 + \overline{Sig12}^2}} \tag{12}
$$

Here, an over-line expresses an average. That is, the two difference signals Sig11, Sig12 are averaged for several tens of nanoseconds to several hundreds of microseconds and the coefficients are found from the formula (12) by the use of the average output and the found coefficients are set in a multiplier and a final signal output can be acquired by adding the products of difference signals Sig11, Sig12 multiplied by the found coefficients α, β to each other, as shown in the formula (II). A denominator in the formula (12) is used for normalizing the coefficients α, β in such a way that $\alpha^2+\beta^2=1$. In principal (if not noises), the denominator ought to be consistently constant and hence, instead of the formula (12), simply, even if the average of the signal Sig1 is set to be α and the average of the signal Sig2 is set to be β, the nearly same effects can be acquired.

<Method of Acquiring RF Signal and FER from Two Sets of Sum-of-Squares Signals Sig1, Sig2>

Here, the first reference light 103*a* incident on the detection optics 11 shown in FIG. 1 is given a predetermined defocus wavefront aberration $W_{20}$ by the first lens 113 and hence is defocused in front the first signal light 102*a* when the signal light 102 collected by the objective lens 112 is focused on the information recording layer of the optical disk 3. A reproducing light detected by the detection optics 11 is the interfering light of the first signal light 102*a* and the first reference light 103*a*, so that the reproducing light is most amplified. In other words, the strongest effect of the interference can be produced when the optical disk 3 is rotated by the rotary motor 201 and hence the plane of the optical disk 3 is oscillated, that is, the information recording layer of the optical disk 3 is shifted in the optical axis direction by a given amount Δ from a focal position of the signal light 102 and the signal light 102 reflected by the optical disk 3 is defocused in front by $W_{20}$ as in the case of the first reference light 103*a*.

On the other hand, the second reference light 103*b* incident on the detection optics 12 shown in FIG. 1 is given a predetermined defocus wavefront aberration $-W_{20}$ by the second lens 114 and hence is defocused behind the second signal light 102*b* when the signal light 102 collected by the objective lens 112 is focused on the information recording layer of the optical disk 3. A reproducing light detected by the detection optics 12 is the interfering light of the second signal light 102*b* and the second reference light 103*b*, so that the reproducing light is most amplified. In other words, the strongest effect of the interference can be produced when the optical disk 3 is rotated by the rotary motor 201 and hence the plane of the optical disk 3 is oscillated, that is, the information recording layer of the optical disk 3 is shifted in the optical axis direction by a given amount −Δ from the focal position of the signal light 102 and the signal light 102 reflected by the optical disk 3 is defocused behind by $W_{20}$ as in the case of the second reference light 103_b_.

Figure 12:
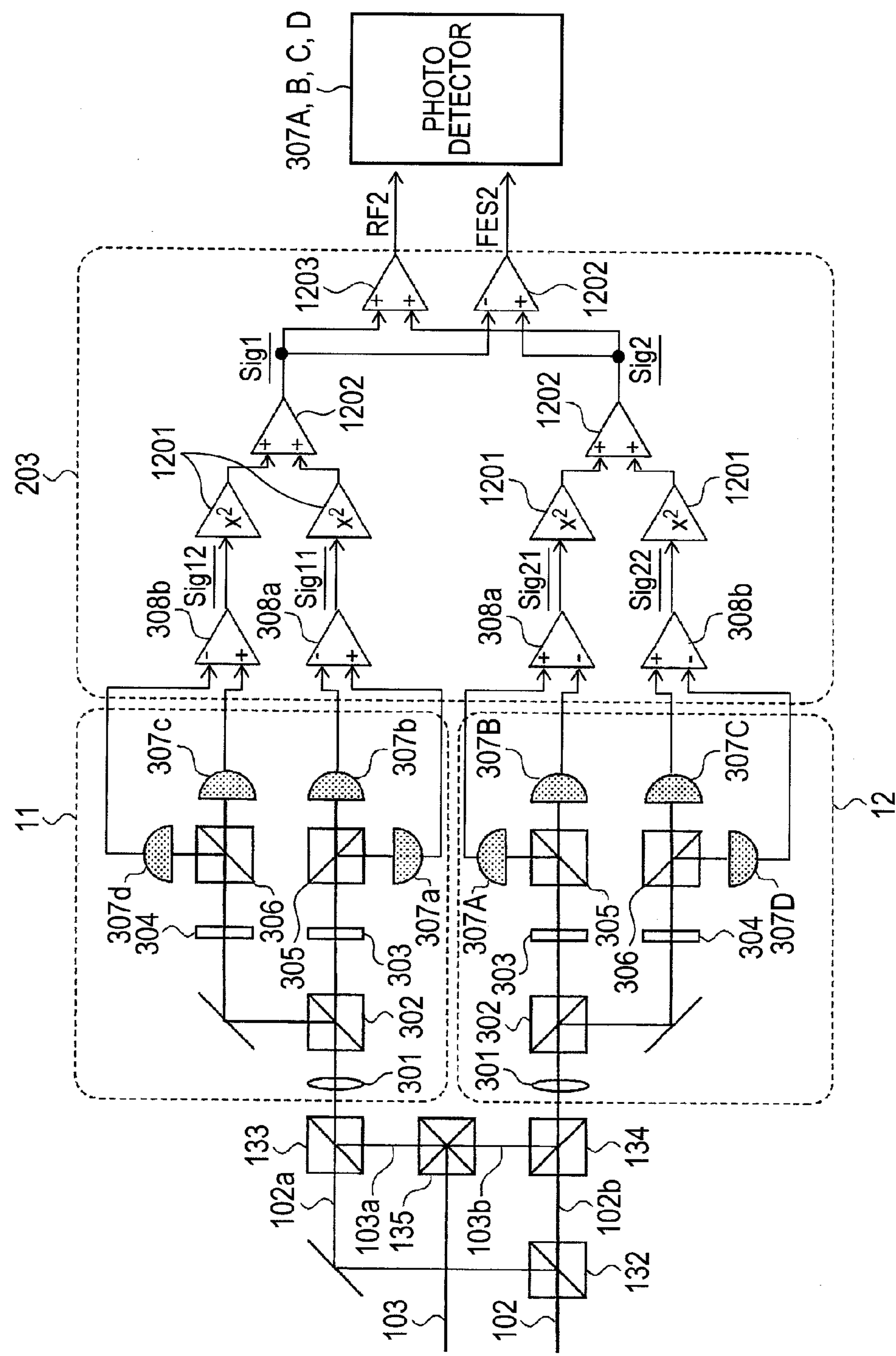
FIG. 12 is a diagram to show an embodiment of an optical pickup optical system and a signal calculation method according to the present invention.

In this way, in the two detection optics 11, 12, the relative position relationship between the objective lens 112 and the information recording layer of the optical disk 3 at which the reproducing light is most amplified can be shifted in front and behind by the same degree as compared with the relative position relationship when the signal light 102 is focused on the information recording layer. Hence, by calculating the difference between these two signals, that is, $$FES2=Sig1-Sig2 \quad (13)$$

a focus error signal can be acquired. Further, by calculating the sum of the two signals, that is, $$RF2=Sig1+Sig2 \quad (14)$$

an intensity signal of the signal light 102 amplified by the reference light 103 can be acquired. A block diagram of a signal calculation method performed by an optical system and the signal processing circuit 203 will be shown in FIG. 12. The optical system includes the detection optics 11 (detectors 307_a_, 307_b_, 307_c_, and 307_d_) and the detection optics 12 (detectors 307A, 307B, 307C, and 307D) for acquiring the RF signal RF and the focus error signal FES2 from the signal light 102 and the reference light 103. In FIG. 12, reference numerals 1201, 1202, and 1203 denote a squaring circuit, an adding circuit, and a differential circuit, respectively.

<Example of Acquiring RF Signal and FES from Two Sets of Sum-of-Squares Signals Sig1, Sig2>

Figure 5A:
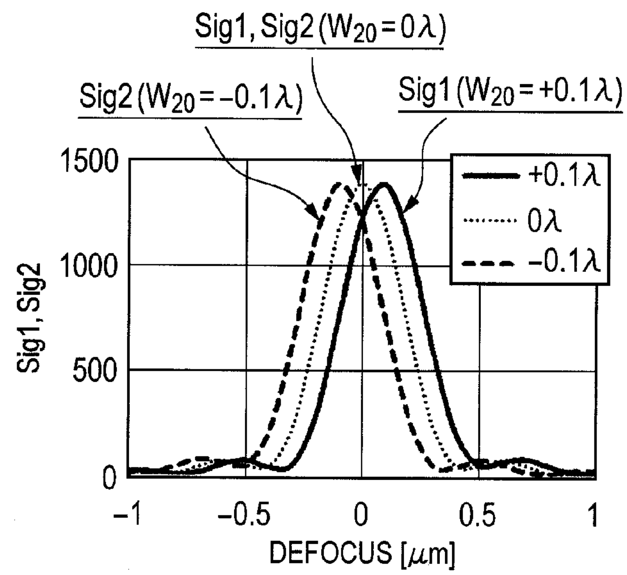
FIGS. 5A, 5B, and 5C are graphs to show simulation results of a readout signal and a focus error signal of an embodiment according to the present invention.
Figure 5B:
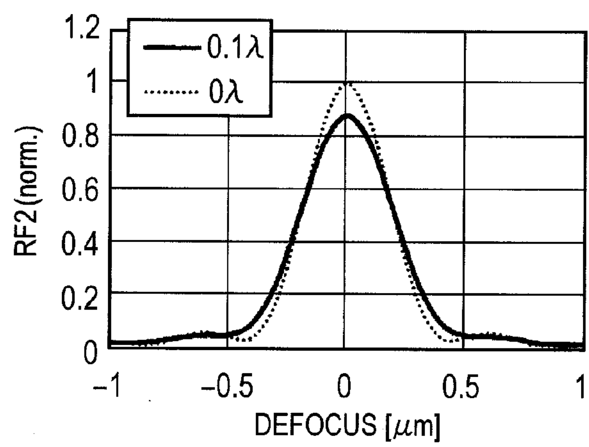
Figure 5C:
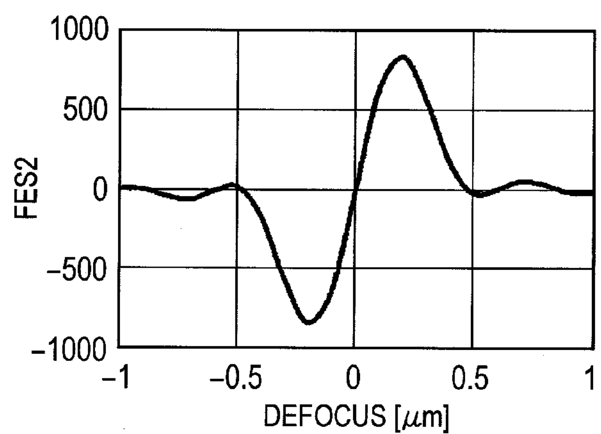

FIGS. 5A, 5B, and 5C show results acquired by confirming the RF signal and the focus error signal according to the present invention by a computer simulation. In the computer simulation, a light intensity distribution on a photo detector was found by Fourier integral on the basis of the scalar diffraction theory. The calculation conditions were as follows: wavelength λ=405 nm, numerical aperture NA of objective lens=0.85, numerical aperture NA of collective lens of detection system=0.085 (magnification factor of return path is 10 times), and size of detector=50 μm square, and a single layer BD made of a substrate having a thickness of 0.1 mm was thought as an optical disk. The defocus wavefront aberration $W_{20}$ given by the first lens 113 and the second lens 114 was assumed to be 0.1λ (57.7 mλrms). FIG. 5A shows two sets of sum-of-squares signals Sig1 (solid line) and Sig2 (broken line). FIG. 5B shows a RF signal RF2 (solid line) shown by the formula (14) acquired from the sum signal of these signals Sig1 and Sig2. FIG. 5C shows a focus error signal FES2 shown by the formula (13) acquired from the difference signal of these signals Sig1 and Sig2. In FIGS. 5A and 5B, for the purpose of reference, the result when $W_{20}=0\lambda$ is shown together by a dotted line. As shown in FIG. 5A, there can be produced two signals Sig1 and Sig2 which are shifted in front and behind with respect to a position in which the output is maximum and defocus is zero. As shown in FIG. 5B, by calculating the sum of these signals, there can be acquired the RF signal which is made maximum when defocus is zero, that is, when the signal light 102 collected by the objective lens 112 is focused on the information recording layer of the optical disk 3. Further, as shown in FIG. 5C, by calculating the difference signal of these signals, there can be acquired a focus error signal shaped like a letter S with respect to defocus.

Figure 6:
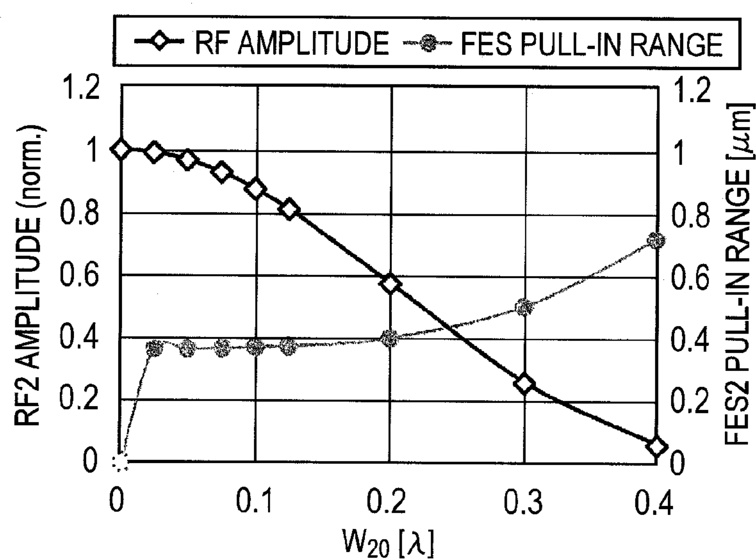
FIG. 6 is a graph to show a simulation result of a relationship between an amount of defocus wavefront aberration given to a reference light and amplitude of a readout signal and a pull-in range of a focus error signal in an embodiment according to the present invention.

In FIG. 6 will be shown a simulation result to show a relationship between a defocus wavefront aberration $W_{20}$ and a magnification factor of a RF signal (normalized when $W_{20}=0$) and a relationship between a defocus wavefront aberration $W_{20}$ and a pull-in range of a focus error signal. As can be seen from FIG. 6, the pull-in range of the focus error signal can be controlled by the defocus wavefront aberration $W_{20}$. On the other hand, when the defocus wavefront aberration $W_{20}$ is large, the magnification factor of the reproducing signal is decreased to impair linearity near a zero point of the focus error signal. Hence, in the present embodiment, it is desired that the defocus wavefront aberration $W_{20}$ given by the first lens 113 and the second lens 114 is 0.4λ or less.

Figure 7A:
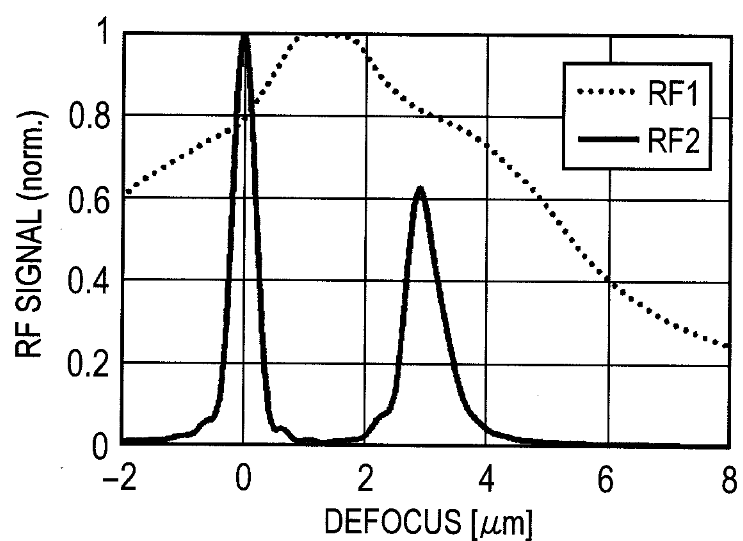
FIGS. 7A and 7B are graphs to show a simulation result of a readout signal and a focus error signal of a double-layer BD in an embodiment according to the present invention.
Figure 7B:
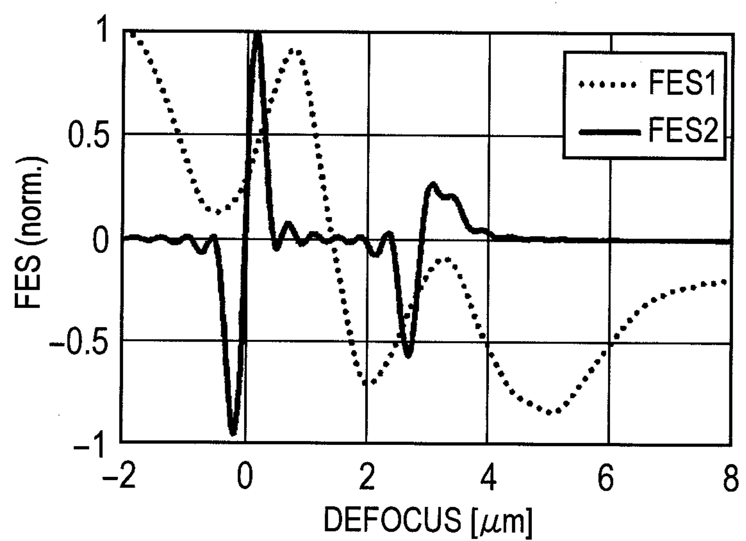

In FIGS. 7A and 7B will be shown simulation results of a RF signal RF2 and a focus error signal FES2 when the present invention is applied to an optical disk having two layers having a layer spacing of 5 μm. For the sake of comparison, simulation results of a readout signal RF1 and a focus error signal FES1 which can be acquired from the output of the photo detector 13 will be shown together by dotted lines. The calculation conditions of RF1 and FES1 were as follows: wavelength λ=405 nm, numerical aperture NA of objective lens=0.85, effective luminous flux diameter=3 mm, numerical aperture NA of collective lens of detection system=0.085 (magnification factor of return path is 10 times), astigmatic difference given by cylindrical lens 117 in detection system=1 mm, detector=four-divided photo detector of 50 μm square, and thickness of substrate of optical disk=0.095 mm, 0.1 mm from this side. The layer spacing of the two layers is as very narrow as 5 μm as compared with a conventional two-layer BD, so that in the readout signal RF1 acquired from the detector 13, the reflected lights from the respective layers can hardly be split and the focus error signal FES1 does not cross zero at a position of 0 μm of the recording layer. On the other hand, in the readout signal RF2 acquired from the detection optics 11, 12, the lights reflected by the respective layers can be clearly split, and in the focus error signal FES2, two separate signals shaped like a letter S are acquired. Hence, by detecting the interfering light of the signal light and the reference light, a signal having a very high selectivity to the defocus of the signal light caused by the face oscillation of the optical disk 3 can be acquired as compared with a case where an intensity signal of only the signal light is detected. As a result, a RF signal and a focus error signal which have resistance to interlayer crosstalk of the multiplayer optical disk can be acquired.

<Another Example of Acquiring RF Signal and FES from in Front/Behind Defocus Amount and Signals Sig1, Sig2>

It is not always necessary that the defocus wavefront aberration $W_1$ given to the first reference light 103_a_ by the first lens 113 and the defocus wavefront aberration $W_2$ given to the second reference light 103_b_ by the second lens 114 in order to acquire the effects described in the present embodiment are opposite to each other in sign and are nearly equal to each other in the absolute value, but in principle, the defocus wavefront aberrations $W_1$, $W_1$ may be different from each other in the absolute value. At this time, as another calculation of the RF signal and the focus error signal shown by the formulas (13), (14), a signal output may be acquired by finding the products of the sum-of-squares signals Sig1, Sig2, which are acquired by the formulas (7), (8), multiplied by coefficients and by adding the products to each other or by subtracting the products from each other. In other words, RF2 and FES2 may be acquired by the formulas (15), (16).

$$RF2=a_1\cdot Sig1+a_2\cdot Sig2 \quad (15)$$

$$a_1^2+a_2^2=1 \quad (15)$$

$$FES2=b_1\cdot Sig1-b_2\cdot Sig2$$

$$b_1^2+b_2^2=1 \quad (16)$$

Coefficients $a_1$ and $a_2$ need to be set in such a way that when the signal light 102 collected by the objective lens 112 is focused on the information recording layer of the optical disk 3, RF2 becomes nearly maximum. Hence, for example, the coefficients $a_1$ and $a_2$ are found by calculating the formula (17).

$$a_1 = \frac{\overline{Sig2}}{\sqrt{\overline{Sig1}^2 + \overline{Sig2}^2}} \qquad (17)$$

$$a_2 = \frac{\overline{Sig1}}{\sqrt{\overline{Sig1}^2 + \overline{Sig2}^2}}$$

Here, the over-line expresses an average. That is, two signals Sig1 and Sig2 are averaged for several tens of nanoseconds to several hundreds of microseconds and the coefficients $a_1$ and $a_2$ are found from the formula (17) by the use of the average outputs and are set in a multiplier and a final signal output can be acquired by adding the products of the difference signals Sig11, Sig12 multiplied by the found coefficients $a_1$, $a_2$ to each other, as shown by formula (15). The coefficients $a_1$ and $a_2$ shown in formula (15) are normalized in such a way that $a_1^2+a_2^2=1$. Further, the amplitude of the RF signal, as shown in FIG. 6, is nearly linear with respect to defocus wavefront aberration W within a range of $W_{20}<0.2\lambda$, so that the coefficients $a_1$ and $a_2$ may be determined by the absolute values of respective wavefront aberrations as shown by formula (18).

$$a_{1,2}=1-cW_{1,2} \qquad (18)$$

For example, as shown in FIG. 6, in an optical system in which $\lambda$=405 nm and numerical aperture of objective lens NA=0.85, C=9.16.

Coefficients $b_1$ and $b_2$ need to be set in such a way that when the signal light 102 collected by the objective lens 112 is focused on the information recording layer of the optical disk 3, FES2=2, that is, $b_1$Sig1 is equal to $b_2$Sig2. Hence, for example, when the optical information recoding and reproducing apparatus 1 is adjusted initially, a focus control is performed to the optical disk 3 having a single layer by the use of the focus error signal FES1 produced by the detector 13 and the coefficients $b_1$ and $b_2$ are found in such a way that FES2=0. The coefficients $b_1$ and $b_2$ in the formula (16) are normalized in such a way that $b_1^2+b_2^2=1$.

<Switching of Focus Error Signal>

Figure 8:
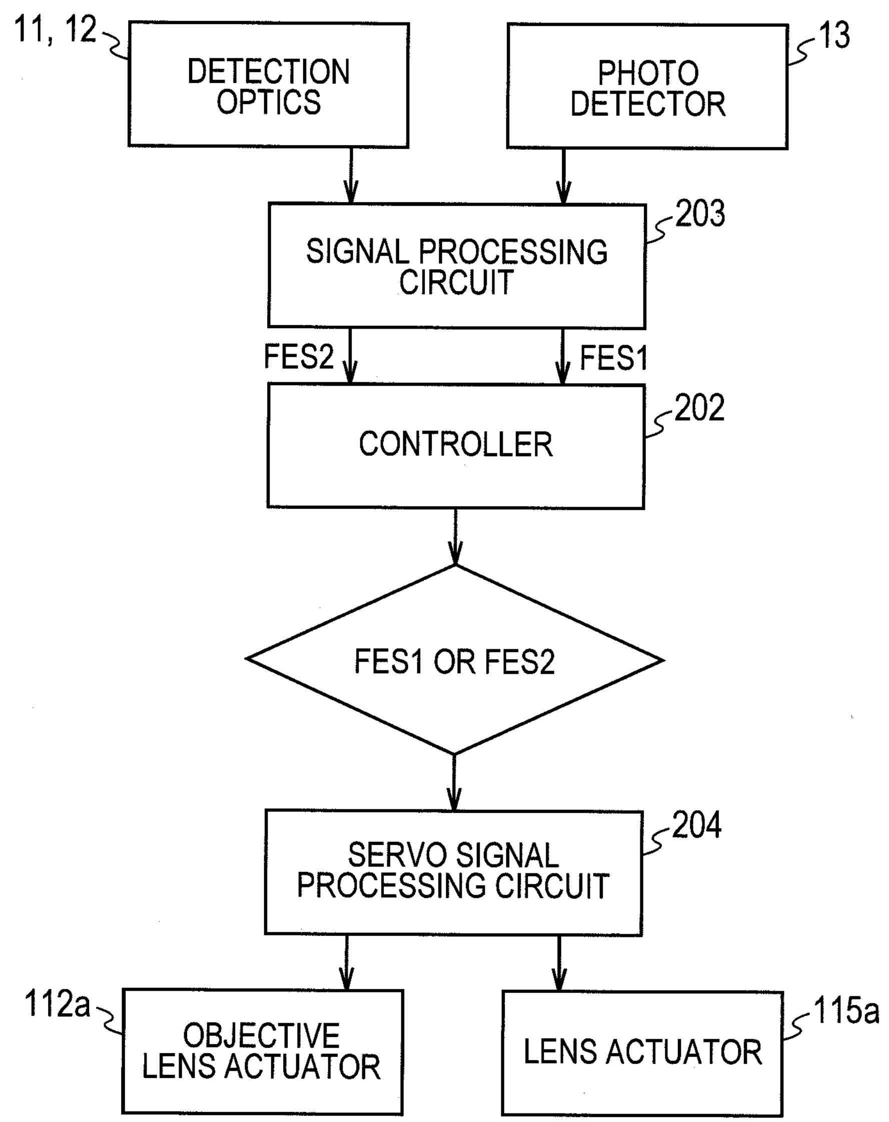
FIG. 8 is a flowchart to show a flow of a focus control according to the present invention.

In the present embodiment, the respective focus error signals FES1, FES2 can be produced from the output of the detector 13 for detecting only the signal light 102 and from the outputs of the detection optics 11, 12 for detecting the mixed light of the signal light 102 and the reference light 103. The FES2 is less affected by the interlayer crosstalk than the FES1, as shown in FIG. 7, but is small in the focus error signal shaped like a letter S from a layer separate from the focal position of the objective lens 112. Hence, there is a possibility that the FES2 will be not suitable for counting the number of layers of a multilayer optical disk and for switching a recording layer (interlayer jumping). Thus, as shown in FIG. 8, the focus error signals FES1, FES2 may be switched by the controller 202 of the optical information recoding and reproducing apparatus 1 shown in FIG. 1 in the following manner: that is, when the focus error signal shaped like a letter S not only of the recording layer but also of layers other than the recording layer is required, for example, when an optical disk having a small number of layers is reproduced, when the optical disk 3 is set in the optical information recoding and reproducing apparatus 1 and then an initial adjustment of the optical information recoding and reproducing apparatus 1 such as the counting of the number of layers is performed, and when the switching of a recoding layer of a multilayer optical disk (interlayer jumping) is performed, the FES1 is used as the focus error signal; whereas when the recoding/reproducing of the multilayer optical disk is performed with the effects of the interlayer crosstalk reduced as little as possible, the FES2 is used as the focus error signal. By performing a feedback control to the objective lens actuator 112*a* in such a way that FES1=0 or FES2=0 via the servo control circuit 204 from the controller 202, a focus control of the objective lens 112 can be performed.

<Another Example of Detection Optics 11, 12>

In the detection optics of the optical pickup 2 according to the present embodiment shown in FIG. 3, the lens 301 is disposed before the beam splitter 302 and the mixed lights are collected on the four detectors 307*a* to 307*d*. However, instead of the lens 301, separate lenses may be disposed between the beam splitter 302 and the polarizing beam splitters 305 and 306, or separate lenses may be disposed between the polarizing beam splitter 305 and detectors 307*a*, 307*b* and between the polarizing beam splitter 306 and detectors 307*c*, 307*d*.

<Another Example of Semiconductor Laser 101>

As the semiconductor laser 101 may be used a laser having a very long coherence length of several centimeters to several meters, for example, a DFB laser. In this case, the coherence length is sufficiently longer than a change in the light path length (up to several 100 μm) of the signal light caused by the oscillation of the face of the optical disk 3, so that the device to control path length of reference light 141 is not required and hence the construction of the optical information recoding and reproducing apparatus 1 can be simplified.

Second Embodiment

Figure 10:
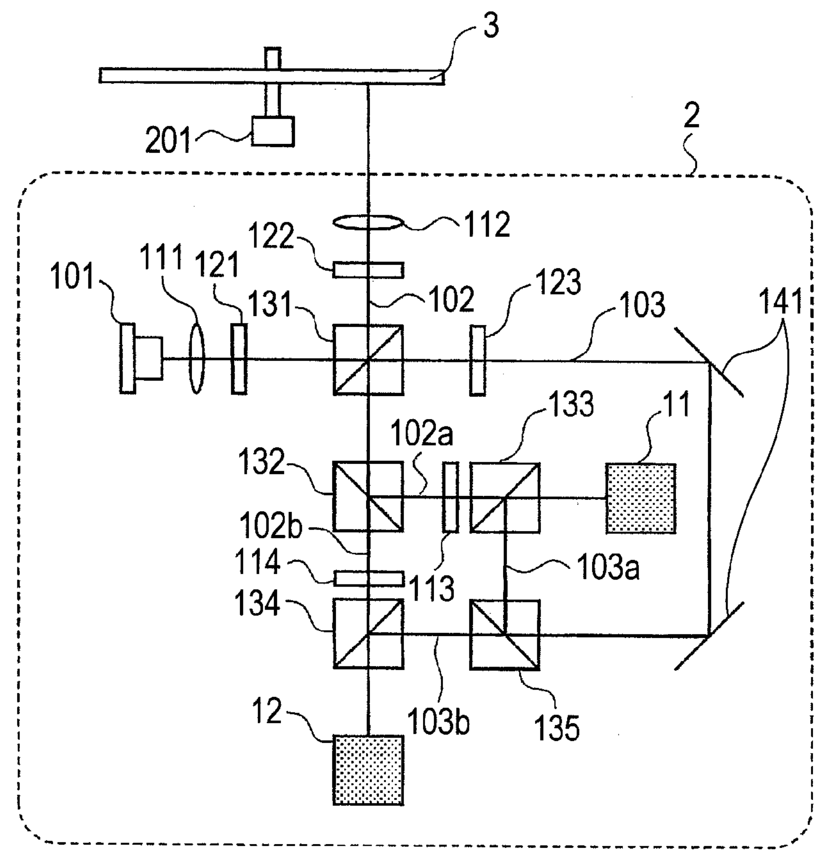
FIG. 10 is a diagram to show another construction example of the optical pickup for realizing the optical information detection method according to the present invention.

In the first embodiment, as shown in FIG. 1, the first reference light 103*a* and the second reference light 103*b* are given defocuses which are opposite in sign by the first lens 113 and the second lens 114. However, as another embodiment according to the present invention, as shown in FIG. 10, the first signal light 102*a* and the second signal light 102*b* may be given defocuses which are opposite in sign. As for the optical pickup 2 shown in FIG. 10, the descriptions of the parts each of which has a construction denoted by the same reference sign as in FIG. 1 described above and has the same function as in FIG. 1 will be omitted.

The reference light 103 transmitted through the half wave plate 121 and transmitted through the polarizing beam splitter 131, as described above, is converted into the perpendicular polarized light by the half wave plate 123 and then is reflected by the reference light reflection means 141 and then is split into the first reference light 103*a* and the second reference light 103*b* by the beam splitter 135. Then, the first reference light 103*a* and the second reference light 103*b* travel toward the detection optics 11 and the detection optics 12, respectively, in the state of the perpendicular polarized light. On the other hand, the signal light 102 reflected by the optical disk 3 and transmitted through the polarizing beam splitter 131 is split into the first signal light 102*a* and the second signal light 102*b* by the beam splitter 132. The first signal light 102*a* and the second signal light 102*b* are given predetermined defocuses by the first lens 113 and the second lens 114, respectively, and then travel toward the detection optics 11 and the detection optics 12, respectively, in the state of the parallel polarized light. The first signal light 102*a* and the first reference light 103_a_ are mixed by the detection optics 11 in the state in which their polarization directions are perpendicular to each other. The second signal light 102_b_ and the second reference light 103_b_ are mixed by the detection optics 12 in the state in which their polarization directions are perpendicular to each other. The optical system constructions of the detection optics 11 and the detection optics 12 are the same as those shown in FIG. 3, but in the present embodiment, the detectors 307_a_, 307_b_, 307_c_, and 307_d_ are disposed at the focal positions of the reference light 103 by the lens 301. In this way, the same effects of the invention as in the first embodiment can be produced.

Third Embodiment

In the first embodiment or the second embodiment, the first lens 113 and the second lens 114 are used as a unit to defocus the first luminous flux or the second luminous flux in front or behind, but a curvilinear diffraction grating may be used. The curvilinear diffraction grating is a diffraction grating made by cutting a so-called Fresnel zone plate, in which gratings are arranged concentrically with their pitches made finer toward its periphery, at a position shifted from its center, and can give diffracted light a lens operation as an effect of the Fresnel zone plate. In this lens operation, + first order diffracted light and − first order diffracted light are opposite to each other in direction. When a convex lens operation is applied to the + first order diffracted light, a concave lens operation is applied to the − first order diffracted light. On the contrary, when a concave lens operation is applied to the + first order diffracted light, a convex lens operation is applied to the − first order diffracted light. In this way, a luminous flux defocused in front and behind with respect to the first luminous flux or the second luminous flux by an equal amount can be formed with good controllability.

Figure 13:
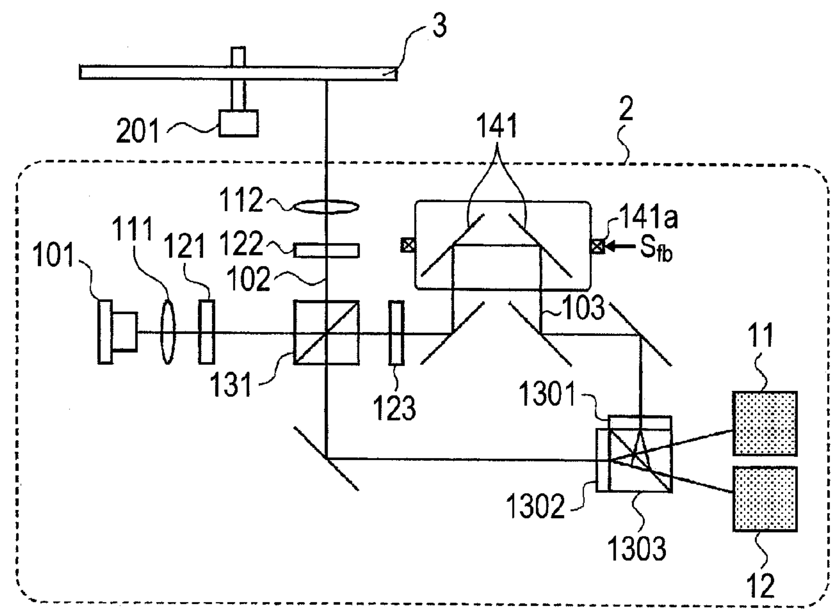
FIG. 13 is a diagram to show another construction example of the optical pickup for realizing the optical information detection method according to the present invention.

In FIG. 13 will be shown a schematic diagram of an optical system of the optical pickup 2 for realizing an optical detection method according to the present embodiment. Here, As for the construction and the function optical pickup 2 shown in FIG. 13, the descriptions of the parts each of which has a construction denoted by the same reference sign as in FIG. 1 described above and has the same function as in FIG. 1 will be omitted. The signal light 102 reflected by the optical disk 3 is transmitted through the objective lens 112 and the quarter wave plate 122 and is transmitted through the polarizing beam splitter 131 in the state of the parallel polarized light and then is incident on a linear diffraction grating 1302. The signal light 102 incident on the linear diffraction grating 1302 is split into the first signal light 102_a_ and the second signal light 102_b_. The first signal light 102_a_ and the second signal light 102_b_ are transmitted through a polarizing beam splitter 1303 and then travel toward the detection optics 11, 12, respectively. On the other hand, the reference light 103 transmitted through the half wave plate 121 and transmitted through the polarizing beam splitter 131 is converted into a perpendicular polarized light by the half wave plate 123 and then is reflected by the reference light reflection means 141 and is incident on the curvilinear diffraction grating 1301. The reference light 103 incident on the curvilinear diffraction grating 1301, as described above, is split into the first reference light 103_a_ of the + first order diffracted light and the second reference light 103_b_ of the − first order diffracted light. The first reference light 103_a_ and the second reference light 103_b_ are reflected by polarizing beam splitter 1303 and travel toward the detection optics 11, 12, respectively. The first reference light 103_a_ is deflected by the curvilinear diffraction grating 1301 and at the same time is given a predetermined amount of defocus. On the other hand, the second reference light 103_b_ is deflected in a direction opposite to the first reference light 103_a_ from the optical axis by the curvilinear diffraction grating 1301 and at the same time is given an amount of defocus which is opposite in sign to the first reference light 103_a_. The optical system constructions of the detection optics 11, 12 are the same as shown in FIG. 3, but in the present embodiment, the detectors 307_a_, 307_b_, 307_c_, and 307_d_ are disposed at the focal positions of the signal light 102 by the lens 301. In this way, the signal light 102 and the reference light 103 traveling toward the detection optics 11, 12 are brought into the same state described in FIG. 1 and in the first embodiment.

Figure 14:
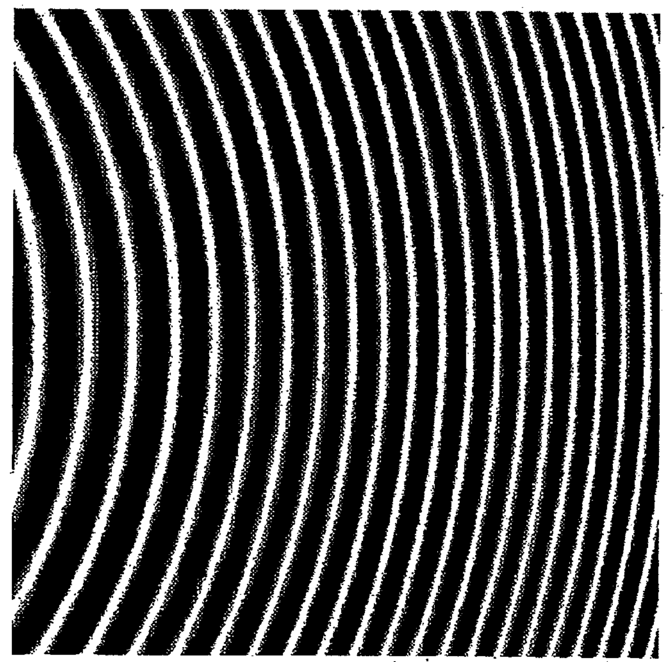
FIG. 14 is an illustration to show a curvilinear diffraction grating used in the present invention.

An example of the curvilinear diffraction grating 1301 will be shown in FIG. 14. However, for the sake of ease, the pitches are shown wider than actual sizes and the radius of curvature are shown larger than actual sizes. Assuming that the wavelength of the semiconductor laser 101, $\lambda$=405 nm; the numerical aperture of the objective lens 112, NA=0.85; luminous flux diameter, $\phi$=3 mm; the focal length of the lens 301 of the detection optics 11, 12, f2=17.647 mm (magnification in return path: 10 times); and amount of shift from the optical axis of four detectors PD1 to PD4 of the detection optics 11, 12, $\Delta$=0.1 mm, it can be found from the formula (19) that a tilt wavefront aberration $W_{11}$ given to the reference light 103 and the signal light 102 by the curvilinear diffraction grating 1301 and the linear diffraction grating 1302, $$\Delta = f_2\theta = f_2\frac{W_{11}\lambda}{\frac{\phi}{2}} \tag{19}$$

$W_{11}$=20.99$\lambda$ where a diffraction angle by the diffraction grating is $\theta$. Assuming that a defocus wavefront aberration $W_{20}$ given to the reference light 103 by the curvilinear diffraction grating 1301 is 0.1$\lambda$, the curvilinear diffraction grating 1301 actually becomes a linear diffraction grating. Here, the example shown in FIG. 14 is the pattern of the curvilinear diffraction grating 1301 when $W_{20}$=0.1$\lambda$ and $W_{11}$=5$\lambda$.

In this way, according to the construction of the present embodiment, the optical system for detecting the mixed light of the signal light and the reference light can be simplified and hence a downsized optical pickup can be realized.

Fourth Embodiment

Figure 28:
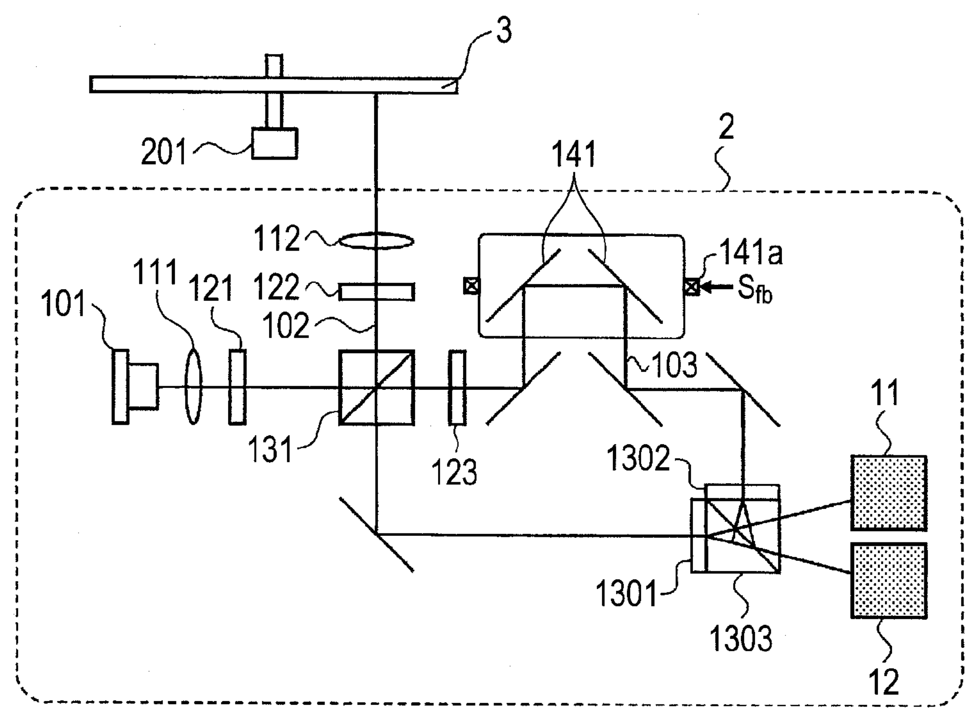
FIG. 28 is a diagram to show still another construction example of the optical pickup for realizing the optical information detection method according to the present invention.

In the third embodiment, as shown in FIG. 13, the first reference light 103_a_ and the second reference light 103_b_ are given defocuses which are opposite in sign by the curvilinear diffraction grating 1301. However, as another embodiment according to the present invention, it may be the first signal light 102_a_ and the second signal light 103_b_ that are given the defocuses which are opposite in sign. In the present embodiment, as shown in FIG. 28, it is recommended that the curvilinear diffraction grating 1301 is disposed in the signal light path between the polarizing beam splitter 131 and the polarizing beam splitter 1303 and that the linear diffraction grating 1302 is disposed in the reference light path between the polarizing beam splitter 131 and the polarizing beam splitter 1303. In this way, the same effects of the present invention as in the third embodiment can be produced.

Fifth Embodiment

Figure 15:
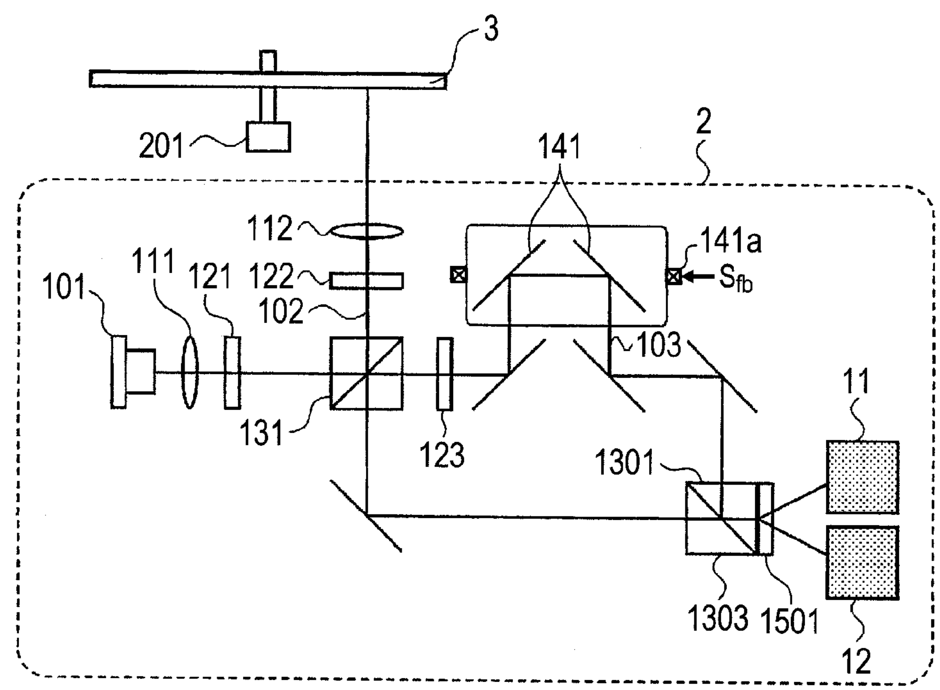
FIG. 15 is a diagram to show still another construction example of the optical pickup for realizing the optical information detection method according to the present invention.

In the third embodiment or the fourth embodiment, the separate diffraction gratings, that is, the curvilinear diffraction grating 1301, and the linear diffraction grating 1302 are used, but as shown in FIG. 15, a polarizing diffraction grating 1501 may be used. The polarizing diffraction grating 1501, as shown in the third embodiment, is made to act as a curvilinear diffraction grating to the signal light 102 of the parallel polarized light and to act as a linear diffraction grating to the reference light 103 of the perpendicular polarized light. Alternatively, as shown in the fourth embodiment, the polarizing diffraction grating 1501 is made to act as a linear diffraction grating to the signal light 102 of the parallel polarized light and to act as a curvilinear diffraction grating to the reference light 103 of the perpendicular polarized light. In this way, as compared with the third embodiment or the fourth embodiment, the number of diffraction gratings in the optical pickup 2 can be reduced and the same effects of the third embodiment or the fourth embodiment can be produced.

Sixth Embodiment

Figure 16:
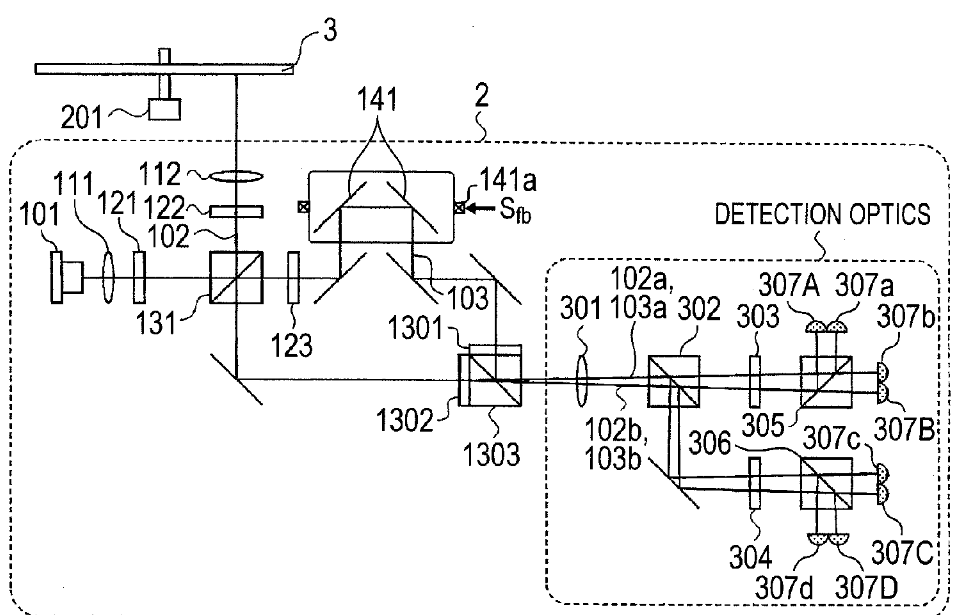
FIG. 16 is a diagram to show still another construction example of the optical pickup for realizing the optical information detection method according to the present invention.

In the third embodiment or the fourth embodiment, separate optical systems are used for the detection optics 11 and the detection optics 12, but common optical parts may be used. In FIG. 16 will be shown a schematic diagram of an optical system of an optical pickup for realizing an optical signal detection method of the present embodiment. Here, as for the construction and the function of the optical pickup 2 shown in FIG. 16, the descriptions of the parts each of which has a construction denoted by the same reference sign as in FIG. 1 and FIG. 13 described above and has the same function as in FIG. 1 and FIG. 13 will be omitted.

The signal light 102 is split into the first signal light 102*a* and the second signal light 102*b* by the linear diffraction grating 1302. The first signal light 102*a* and the second signal light 102*b* are transmitted through the polarizing beam splitter 1303 and are collected by the lens 301. On the other hand, the reference light 103 is split into the first reference light 103*a* and the second reference light 103*b* by the curvilinear diffraction grating 1301. The first reference light 103*a* and the second reference light 103*b* are transmitted through the polarizing beam splitter 1303 and are collected by the lens 301.

One part of the mixed light of the first signal light 102*a* and the first reference light 103*a* is transmitted through the beam splitter 302 of a half mirror and has its polarization direction rotated by the half wave plate 303 and is split into two components by the polarizing beam splitter 305. The two components are detected by the detectors 307*a*, 307*b*, respectively. The other part of the mixed light is reflected by the beam splitter 302 and has its polarization direction rotated by the quarter wave plate 304 and is split into two components by the polarizing beam splitter 306. The two components are detected by the detectors 307*c*, 307*d*, respectively. When a difference between the detectors 307*a* and 307*b* is detected and a difference between the detectors 307*c* and 307*d* is detected, the difference signals Sig11, Sig12 shown by the formula (5) and the formula (6) can be acquired. Further, by calculating the sum of squares of the difference signals Sig11, Sig12, the sum-of-squares signal Sig1 shown by the formula (7) can be acquired.

Similarly, one part of the mixed light of the second signal light 102*b* and the second reference light 103*b* is transmitted through the beam splitter 302 of the half mirror and has its polarization direction rotated by the half wave plate 303 and is split into two components by the polarizing beam splitter 305. The two components are detected by the detectors 307A, 307B, respectively. The other part of the mixed light is reflected by the beam splitter 302 and has its polarization direction rotated by the quarter wave plate 304 and is split into two components by the polarizing beam splitter 306. The two components are detected by the detectors 307C, 307D, respectively. By detecting a difference between the detectors 307A and 307B and a difference between the detectors 307C and 307D and by calculating the sum of squares of the differences, the sum-of-squares signal Sig2 shown by the formula (8) can be acquired.

In this way, according to the construction of the present embodiment, the optical system for detecting the mixed light of the signal light and the reference light can be simplified and hence a downsized optical pickup can be realized.

Seventh Embodiment

Figure 11:
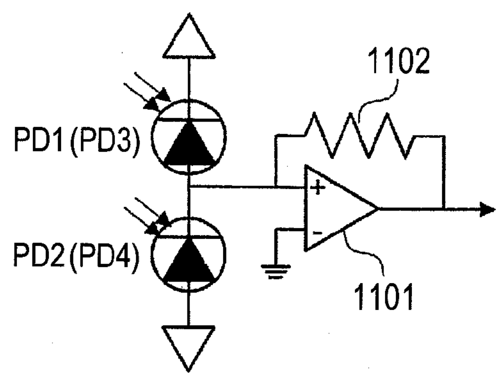
FIG. 11 is a diagram to show an embodiment of a calculation circuit according to the present invention.

In the embodiment described above is shown an example in which a differential calculation between the detectors is realized by a simple differential circuit. However, actually, each of the detectors is provided with a current/voltage (IV) conversion amplifier and an electric output signal from the detector (OEIC) integrated with the IV conversion amplifier is usually used. However, the IV conversion circuit itself causes noises. The noises are caused by the thermal noises of a feedback resistance built in the amplifier and the thermal noises are uniquely determined by the resistance. Hence, like the present invention, an increase in the number of detectors leads to an increase in the amplifier noises. Thus, as a difference detection method for inhibiting an increase in the amplifier noises is proposed a method of using a circuit construction shown in FIG. 11. In this difference detection method, detectors PD1 and PD2 are directly coupled to each other and an IV amplifier 1101 is connected to a connection point of the detectors PD1 and PD2 and a difference signal of two detectors can be acquired by one amplifier, so that in principal, a noise reduction of 3 dB can be achieved. Further, the difference calculation is finished already at an input step of the amplifier, so that a DC component is canceled to prevent the possibility that the amplifier will be saturated, whereby an IV conversion can be made at a high gain. That is, the feedback resistance 1102 can be made large. The thermal noises are proportional to the square root of the feedback resistance 1102 and an output is proportional to the feedback resistance 1102, so that an output/noise ratio is increased proportionally to the square root of the feedback resistance 1102. In other words, a high Signal to Noise ratio can be acquired.

Eighth Embodiment

Figure 17:
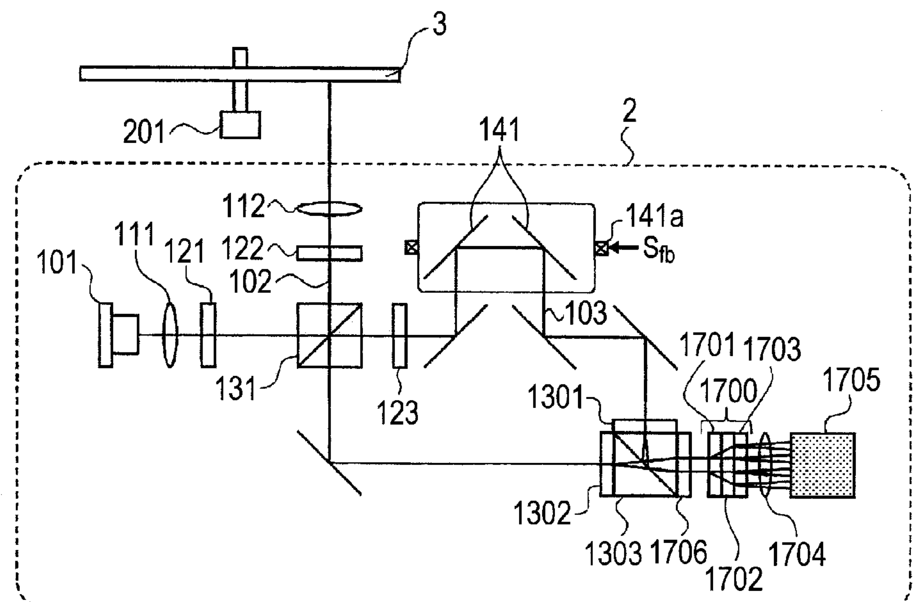
FIG. 17 is a diagram to show still another construction example of the optical pickup for realizing the optical information detection method according to the present invention.

FIG. 17 shows an example of another optical system construction of the optical pickup 2 in the optical information recoding and reproducing apparatus 1. In the detection optics (FIG. 3) of the optical pickup 2 shown in FIG. 1, FIG. 10, FIG. 13, and FIG. 15, the signals shown by the formulas (1), (2), (3), and (4) are detected by separate photo detectors. However, the signals may be received by a detector 1705 in which these detectors are packaged in one detector and a signal calculation may be performed by the signal calculation circuit 203. The signal light 102 reflected by the optical disk 3 and the reference light 103 reflected by the reference light reflection means 141 are split into the first signal light 102*a* and the second signal light 102*b* and into the first reference light 103*a* and the second reference light 103*b* by the curvilinear diffraction grating 1301 and the linear diffraction grating 1302, respectively. Then, the first signal light 102*a* and the second signal light 102*b* and the first reference light 103*a* and the second reference light 103*b* are incident on the polarizing beam splitter 1303, whereby the first signal light 102*a* and the first reference light 103*a* are mixed and the second signal light 102*b* and the second reference light 103*b* are mixed, respectively. Each of the mixed light is collimated parallel to the optical axis by a non-polarizing diffraction grating 1706 and then is incident on a polarization convertor and retarder 1700, thereby being split into four lights, which are different from each other in a phase difference caused by the interference of two lights. The four lights are collected by a lens 1704 and the respective mixed light of the four lights are detected by four PDs (307*a*, 307*b*, 307*c*, and 307*d* and 307A, 307B, 307C, and 307D; 8 in total) disposed on the detector 1705 for the respective lights.

Figure 18:
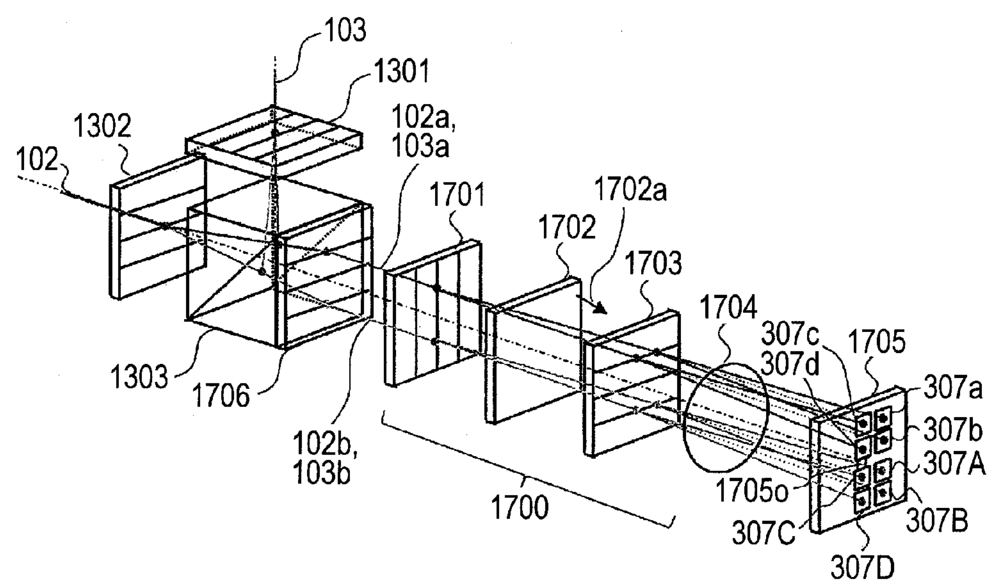
FIG. 18 is an illustration of a polarization convertor and retarder.

FIG. 18 illustrates the structure and the function of the polarization convertor and retarder 1700. The polarization convertor and retarder 1700 is constructed of a non-polarizing diffraction grating 1701, an angle filter (which converts polarization and direction) 1702, and a polarization splitting diffraction grating 1703. In FIG. 7, these parts are shown in an integrated state, but in FIG. 18, for convenience of description, the parts are shown separately from each other. Even if the parts are integrated into one or separated from each other, the function of the polarization convertor and retarder 1700 is not changed. Since the function of polarization convertor and retarder 1700 is not changed for two mixed lights of the first and the second mixed lights, the function of the polarization convertor and retarder 1700 will be described by the use of the mixed light of the first signal light 102*a* and the first reference light 103*a*.

When the first signal light 102*a* and the first reference light 103*a* are incident on the non-polarizing diffraction grating 1701, the two lights are split into two lights different in a travel direction regardless of polarization direction, respectively. This can be easily realized by blazing the non-polarizing diffraction grating 1701. One light is a 0 order light traveling straight and the other light is a first order diffracted light diffracted by a given diffraction angle. Next, these lights are incident on the angle filter (which converts polarization and direction) 1702. Here, the 0 order light traveling straight does not develop a phase difference, but the first order diffracted light incident on the skew develops a phase difference of 90 degrees between the signal light and the reference light. For this purpose, it is essential only that an optical axis 1702*a* has a uniaxial anisotropy perpendicular to an incident surface of the angle filter (which converts polarization and direction) 1702 and that the diffraction direction of the diffracted light of the non-polarizing diffraction grating 1701 coincides with the polarization direction of the first signal light 102*a* or the polarization direction of the first reference light 103*a*. At this time, the phase difference between the signal light component and the reference light component of the first order diffracted light can be uniquely determined by the thickness of the angle filter (which converts polarization and direction) 1702, an anisotropic amount of a refractive index (difference between a refractive index in a perpendicular direction and a refractive index in-plane refractive index), and an incidence angle of the first order diffracted light.

Further, the light emitted from the angle filter (which converts polarization and direction) 1702 is made incident on the polarization splitting diffraction grating 1703. As the polarization splitting diffraction grating 1703 can be used, for example, an element described in Japanese Patent No. 3832243. The polarization splitting diffraction grating 1703 can be easily realized by forming a blaze grating of an anisotropic material such as liquid crystal, lithium niobate, and crystal. That is, since the material has a refractive index changed in the polarization direction, it is essential only that the gratings are arranged in such a way that a phase distribution in one polarization direction by the grating is reverse to a phase distribution in a polarization direction perpendicular to the one polarization direction by the grating. In this way, the polarization direction of the + first order diffracted light can be made perpendicular to the polarization direction of the − first order diffracted light. Alternatively, an element made by bonding anisotropic optical crystals such as a Wollaston prism may be used in place of the polarization splitting diffraction grating 1703. In the present embodiment, directions in which the polarized light is split are one direction of 45 degrees with respect to the signal light and the reference light and a direction perpendicular to the one direction. In this way, phase differences in the interference of the signal light component with the reference light component in the four lights split can be made 0°, 90°, 180°, and 270° as shown in the drawing.

Further, it is possible to design a 0 order light to be developed, the 0 order light being not diffracted by any one of the curvilinear diffraction grating 1301, the linear diffraction grating 1302, the non-polarizing diffraction gratings 1706, 1701, and the polarization splitting diffraction grating 1703. Hence, a light receiving part 1705*o* may be disposed neat the optical axis of the center of the detector 1705. It is also recommended to apply the signal light and/or the reference light to the light receiving part 1705*o* and to adjust the positions and inclinations of the polarization convertor and retarder 1700 and the detector 1705 by the use of an output detected by the light receiving part 1705*o*.

In this way, according to the construction of the present embodiment, an optical system for detecting the interfering light of the signal light and the reference light can be simplified and hence a downsized optical pickup can be realized.

[Patent document 2 ] Japanese Patent No. 3832243

Ninth Embodiment

In the embodiment described above, the mixed lights of the signal light 102 reflected by the optical disk 3 and the reference light 103 reflected by the reference light reflection means 141 are detected by four first detectors and four second detectors in the state in which phase relationships between the signal light and the reference light are different from each other by about 90 degrees. However, in the present embodiment, the mixed lights of the signal light 102 and the reference light 103 are detected by four first detectors, four second detectors, and four third detectors.

<Construction of Three Sets of Detection Optics (1 set for RF and 2 Sets for FES)>

Figure 19:
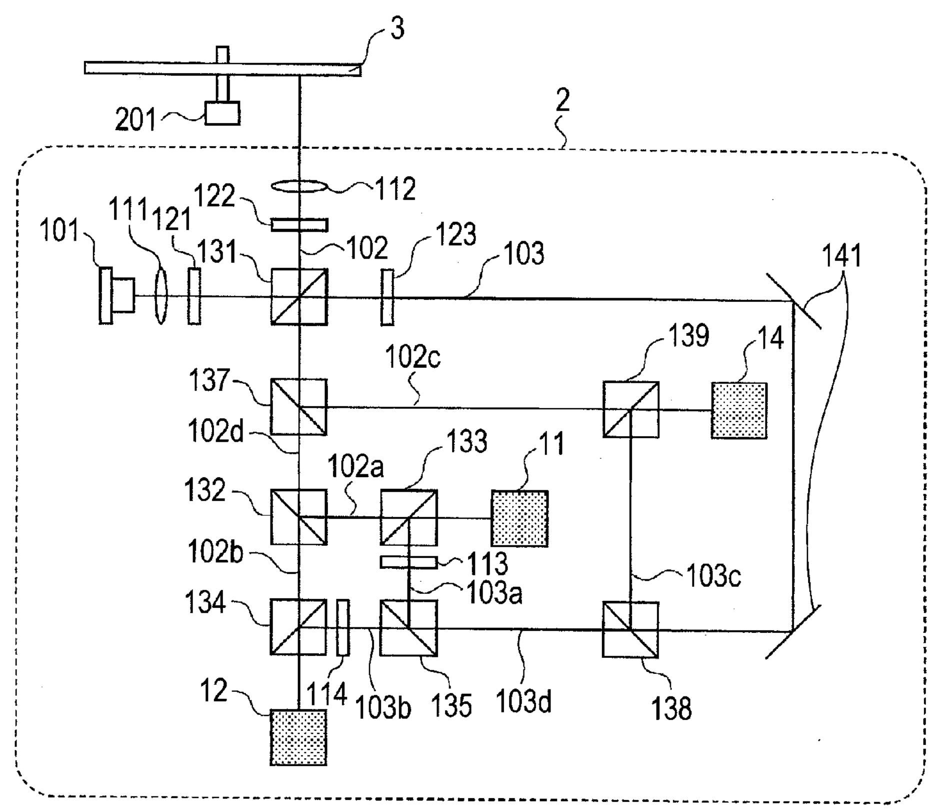
FIG. 19 is a diagram to show still another construction example of the optical pickup for realizing the optical information detection method according to the present invention.

FIG. 19 shows an example of an optical system of the optical pickup 2 of the present embodiment. Here, as for the construction and the function of the optical pickup 2 shown in FIG. 19, the descriptions of the parts each of which has a construction denoted by the same reference sign as in FIG. 1 described above and has the same function as in FIG. 1 will be omitted.

The signal light 102 reflected by the optical dusk 3 is transmitted through the objective lens 11 and the half wave plate 122 is made the parallel polarized light and is transmitted through the polarizing beam splitter 131 and is split by a beam splitter 137. A third signal light 102*c* reflected by the beam splitter 137 is transmitted through a polarizing beam splitter 139 and travels toward a detection optics 14. On the other hand, the signal light 102*d* transmitted through the beam splitter 137 is split by a beam splitter 132 of a half mirror into the first signal light 102*a* and the second signal light 102*b*. The first signal light 102*a* and the second signal light 102*b* travel toward the detection optics 11 and the detection optics 12.

Further, the reference light 103 of the parallel polarized light transmitted through the half wave plate 121 and the polarizing beam splitter 131 is converted into the perpendicular polarized light by the half wave plate 123 and then is reflected by the reference light reflection means 141 and then is split by a beam splitter 138. A third reference light 103*c* reflected by the beam splitter 138 is reflected by a polarizing beam splitter 139 and then travels toward the detection optics 14. On the other hand, a reference light 103*d* transmitted through the beam splitter 138 is split by a beam splitter 135 of a half mirror into the first reference light 103*a* and the second reference light 103*b*. The first reference light 103*a* and the second reference light 103*b* are given a predetermined defocus by the first lens 113 and the second lens 114, respectively, and then travel toward the detection optic 11 and the detection optics 12.

<Method for Acquiring Three Sets of Sum-of-Squares Signals Sig1, Sig2, and Sig3, and Calculation of RF and FES>

The first signal light 102*a* and the first reference light 103*a* are mixed by the detection optics 11 in the state in which their polarization direction are perpendicular to each other. The second signal light 102*ab* and the second reference light 103*b* are mixed by the detection optics 12 in the state in which their polarization direction are perpendicular to each other. The third signal light 102*c* and the third reference light 103*c* are mixed by the detection optics 14 in the state in which their polarization direction are perpendicular to each other. The detection optics 11, 12, and 14 can be realized, for example, by the construction shown in FIG. 3, respectively. The sum-of-squares signals Sig1, Sig2 are produced from the outputs of the detection optics 11, 12 and a focus error signal FES2 is acquired from a difference signal of these signals as shown by the formula (13). On the other hand, also in the detection optics 14, two difference signal Sig31, Sig32 are produced from the outputs of four detectors PD1B, PD2B, PD3B, and PD4B by the differential circuit as shown by the formula (5). Further, as shown by the formula (7), $$Sig3=(Sig31)^2+(Sig32)^2 \quad (20)$$

Sig3 is acquired by performing the sum of squares. The Sig3 is made a RF signal RF2. Alternatively, $$RF2=Sig1+Sig2+Sig3 \quad (21)$$

by the formula (20), the RF signal of the signal light 102 amplified by the reference light 103 is acquired.

According to the present embodiment, the RF signal and the focus error signal can be produced independently of the output of the other detection optics, so that the RF signal efficiently amplified by the reference light can be acquired and at the same time a pull-in range of the focus error signal can be designed independently of the amplification factor of the readout signal.

<Another Example of Beam Splitter 137 (138) for Optically Splitting Third Signal from First and Second Signals (Reference Light)>

The splitting ratio of the third signal light 102*c* to the remaining signal light 102*d* by the beam splitter 137 is arbitrarily determined. However, in order to more amplify the RF signal, it is desired to make the amount of light of the third signal light 102*c* larger than the amount of light of the signal light 102*d*. Further, the splitting ratio of the third reference light 103*c* to the remaining reference light 103*d* by the beam splitter 138 is arbitrarily determined.

<Another Construction of Three Sets of Detection Optics (Curvilinear Diffraction Grating)>

Figure 20:
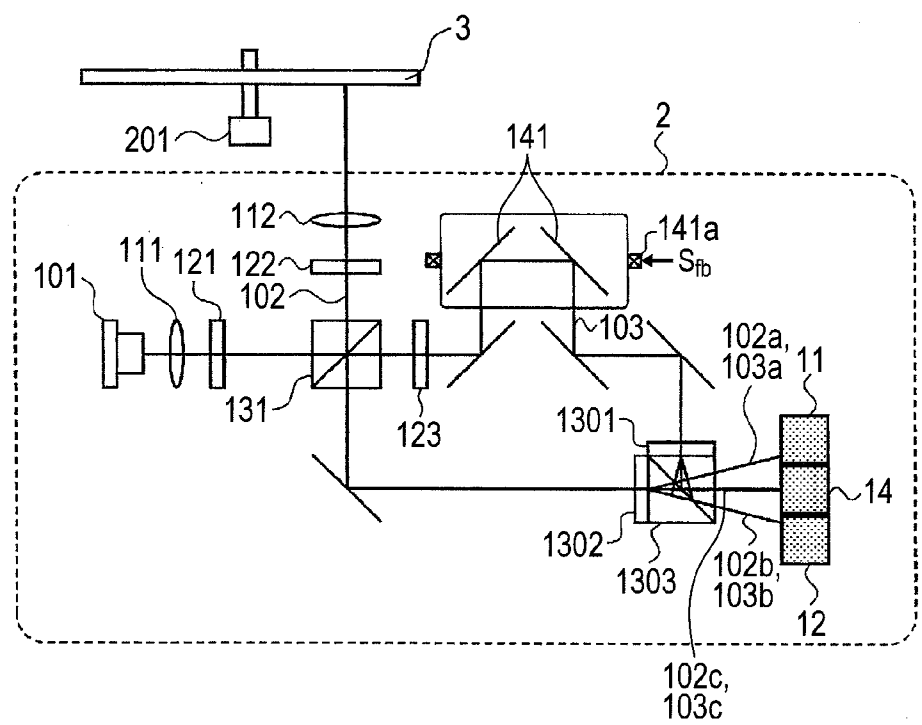
FIG. 20 is a diagram to show still another construction example of the optical pickup for realizing the optical information detection method according to the present invention.

FIG. 20 shows another example of an optical system of the optical pickup 2 of the present embodiment. Here, as for the construction and the function of the optical pickup 2 shown in FIG. 20, the descriptions of the parts each of which has a construction denoted by the same reference sign as in FIG. 1 and FIG. 13 described above and has the same function as in FIG. 1 and FIG. 13 will be omitted.

In the optical pickup 2 shown in FIG. 20, the curvilinear diffraction grating 1301 is used so as to produce the third signal light 102*c* and the first and second signal lights 102*a*, 102*b*. Further, the linear diffraction grating 1302 is used so as to produce the third reference light 103*c* and the first and second reference lights 103*a*, 103*b*. Specifically, the 0 order diffracted light of the curvilinear diffraction grating 1301 is made the third signal light 102*c*; the ±1 order diffracted light of the linear diffraction grating 1302 are made the first and second signal lights 102*a*, 102*b*; the 0 order diffracted light of the linear diffraction grating 1302 is made the third reference light 103*c*; and the ±1 order diffracted light of the linear diffraction grating 1302 are made the first and second signal lights 103*a*, 103*b*. The ±1 order diffracted light of the curvilinear diffraction grating 1301 have the convex lens operation and the concave operation applied thereto.

In the curvilinear diffraction grating and the linear diffraction grating, the diffraction efficiencies of the 0 order diffracted light and the ±1 order diffracted light can be freely controlled by the depth of the groove of the grating. Assuming that the refractive index of the diffraction grating is n, the depth of the groove is d [λ], the duty ratio of the width of the groove is τ, the diffraction efficiencies of the 0 order diffracted light and the ±1 order diffracted light are given by the following formulas (22), (23).

$$\eta_0 = 1 - 4\tau(1-\tau)\sin^2((n-1)d\pi) \quad (22)$$

$$\eta_{\pm 1} = \left(\frac{2}{\pi}\right)^2 \sin^2((n-1)d\pi)\sin^2(\tau\pi) \quad (23)$$

For example, when n=1.5, d=0.3λ, and τ=79.4, the diffraction efficiencies of the 0 order diffracted light and the ±1 order diffracted light are as follows: $\eta_0$=8.4% and $\eta_{\pm 1}$=8.4%.

The first and second signal lights 102*a*, 102*b* and the first and second reference lights 103*a*, 103*b* are mixed by a polarizing beam splitter 1303, respectively. The mixed lights travel toward the detection optics 11, 12 and, as described above, are used for producing the focus error signal FES2. The third signal light 102*c* and the third reference light 103*c* are mixed by the polarizing beam splitter 1303 and the mixed light travels toward the detection optics 14 and, as described above, is used for producing the RF signal.

According to this construction, the optical system for detecting the interfering light of the signal light and the reference light can be simplified and hence a downsized optical pickup can be realized.

<Another Construction of Three Sets of Detection Optics (Common Use of Optical Parts)>

Figure 21:
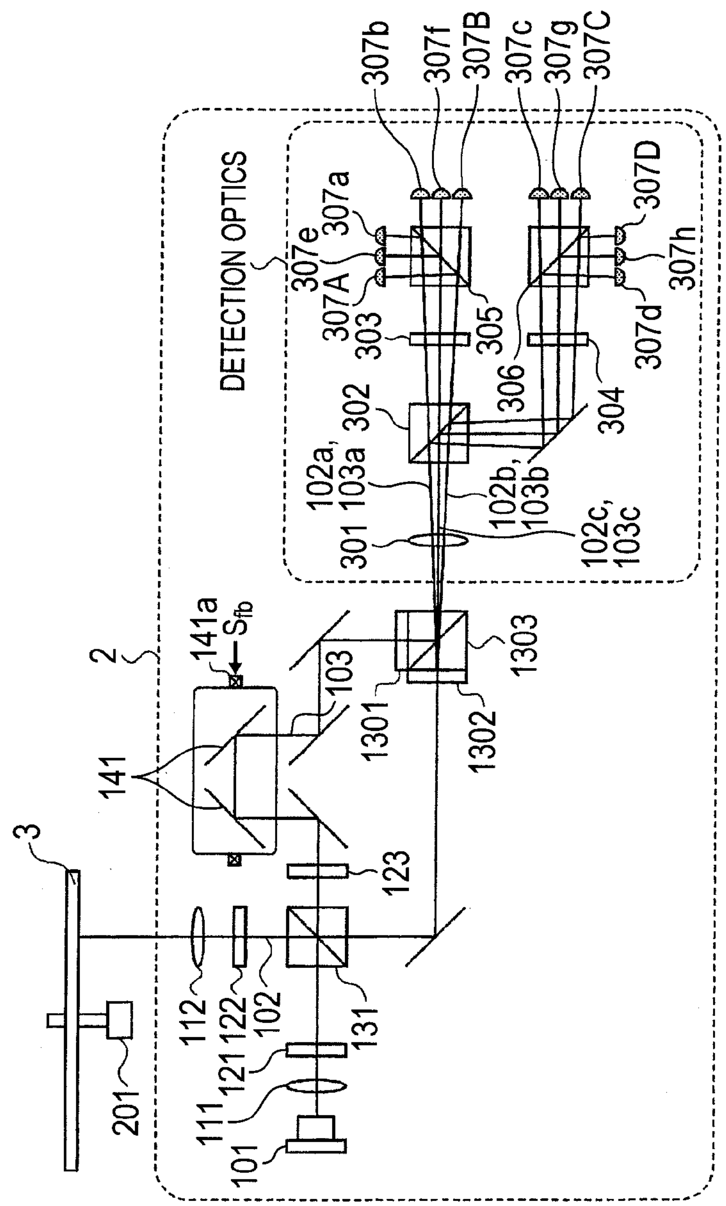
FIG. 21 is a diagram to show still another construction example of the optical pickup for realizing the optical information detection method according to the present invention.

FIG. 21 shows another example of an optical system of the optical pickup 2 of the present embodiment. Here, as for the construction and the function of the optical pickup 2 shown in FIG. 21, the descriptions of the parts each of which has a construction denoted by the same reference sign as in FIG. 1, FIG. 16, and FIG. 20 described above and has the same function as in FIG. 1 FIG. 16, and FIG. 20 will be omitted.

In the optical pickup 2 shown in FIG. 21, as in the case of FIG. 20, the curvilinear diffraction grating 1301 is used so as to produce the third signal light 102*c* and the first and second signal lights 102*a*, 102*b*. Further, the linear diffraction grating 1302 is used so as to produce the third reference light 103c and the first and second reference lights 103a, 103b. In FIG. 20, the detection optics 11, 12, and 14 use separate optical systems but may use common optical parts, as in the case of FIG. 16. The mixed light of the third signal light 102c and the third reference light 103c are detected by detectors 307e, 307f, 307g, and 307h. The mixed light of the first signal light 102a and the first reference light 103a are detected by detectors 307a, 307b, 307c, and 307d. The mixed light of the second light 102b and the second reference light 103b are detected by detectors 307A, 307B, 307C, and 307D.

According to this construction, the optical system for detecting the interfering light of the signal light and the reference light can be simplified and hence a downsized optical pickup can be realized.

<Another Construction of Three Sets of Detection Optics (Integrating Optical System)>

Figure 22:
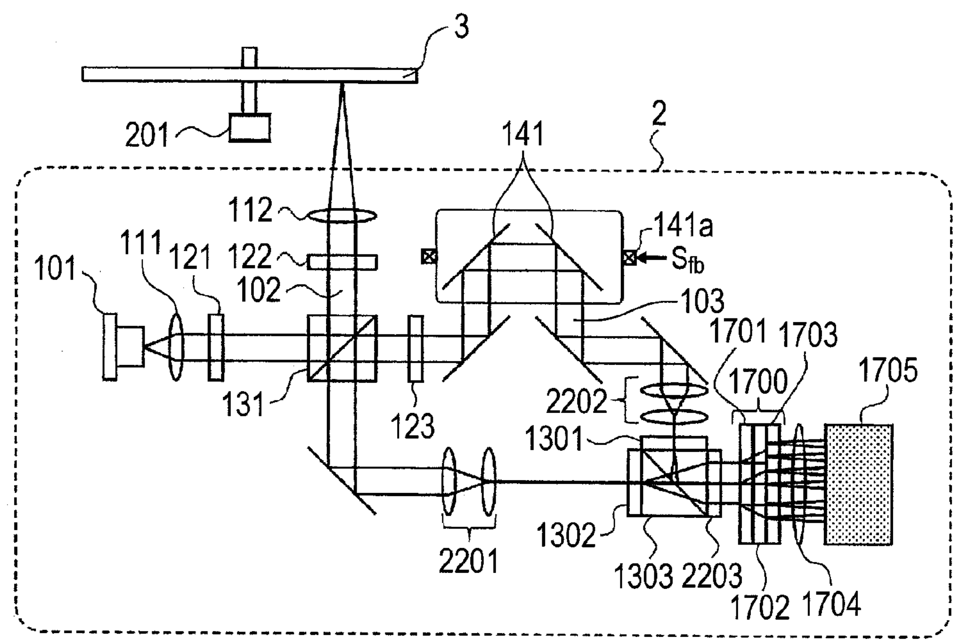
FIG. 22 is a diagram to show still another construction example of the optical pickup for realizing the optical information detection method according to the present invention.

FIG. 22 shows another example of an optical system of the optical pickup 2 of the present embodiment. Here, as for the construction and the function of the optical pickup 2 shown in FIG. 22, the descriptions of the parts each of which has a construction denoted by the same reference sign as in FIG. 1, FIG. 17 described above and has the same function as in FIG. 1, FIG. 17 will be omitted.

In the optical pickup 2 shown in FIG. 22, as in the case of FIG. 20, the curvilinear diffraction grating 1301 is used so as to produce the third signal light 102c and the first and second signal lights 102a, 102b. Further, the linear diffraction grating 1302 is used so as to produce the third reference light 103c and the first and second reference lights 103a, 103b. Still further, the light signals shown by the formulas (1), (2), (3), and (4) are received by a packaged detector 1705 and a signal calculation is performed by the signal calculation circuit 203.

The signal light 102 reflected by the optical disk 3 and the reference light 103 reflected by the reference light reflection means 141 are split by the curvilinear diffraction grating 1301 and the linear diffraction grating 1302, respectively, and are incident on the polarizing beam splitter 1303 in which the first signal light 102a and the first reference light 103a, the second signal light 102b and the second reference light 103b, and the third signal light 102c and the third reference light 103c are mixed, respectively, and the mixed lights are incident on a non-polarizing diffraction grating 2203. Here, in order to prevent the respective mixed lights from overlapping each other on the non-polarizing diffraction grating 2203, the signal light 102 and the reference light 103 have their beam diameters made small in advance by beam expanders 2201, 2202. The non-polarizing diffraction grating 2203 has a grating pattern formed only in an area through which the mixed light of the first signal light 102a and the first reference light 103a and the mixed light of the second signal light 102b and the second reference light 103b are transmitted. On the other hand, the non-polarizing diffraction grating 2203 does not have a grating pattern formed in an area through which the mixed light of the third signal light 102c and the third reference light 103c is transmitted. In this way, the mixed light of the first signal light 102a and the first reference light 103a and the second signal light 102b and the second reference light 103b are returned to parallel to the optical axis by the non-polarizing diffraction grating 2203. Further, the mixed light of the third signal light 102c and the third reference light 103c is transmitted through the non-polarizing diffraction grating 2203 in a state parallel to the optical axis. The respective mixed lights are incident on a polarization convertor and retarder 1700 and are split into four lights in which a phase difference developed by the interference of two lights is different from each other. The split lights are collected by a lens 1704 and are detected respectively by four PDs (307z, 307b, 307c, and 307d; 307A, 307B, 307C, and 307D; and 307e, 307f, 307g, and 307h: 12 PDs in total.) disposed on the detector 1705 for respective mixed lights.

Figure 23:
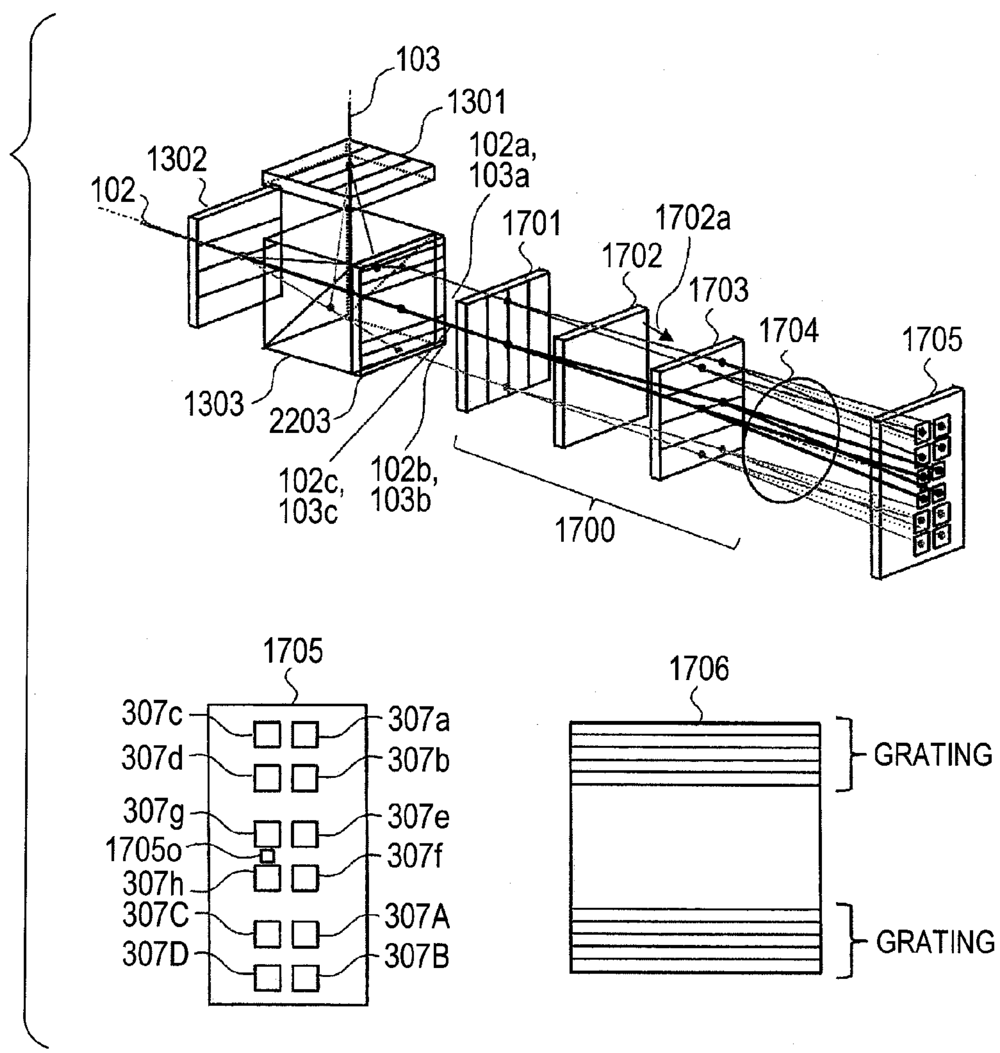
FIG. 23 is an illustration of a polarization convertor and retarder.

FIG. 23 illustrates the structure and the function of the polarization convertor and retarder 1700. The polarization convertor and retarder 1700 shown in FIG. 23 has the same structure and function as the polarization convertor and retarder 1700 shown in FIG. 18. However, in this construction, polarization conversion and retardation are performed also for the mixed light of the third signal light 102c and the third reference light 103c. In this way, phase differences in the interference of the signal light component with the reference light component in the four lights into which the three mixed light are split can be made 0°, 90°, 180°, and 270°, as shown in the drawing.

According to this construction, the optical system for detecting the interfering light of the signal light and the reference light can be simplified and hence a downsized optical pickup can be realized.

Tenth Embodiment

Figure 29:
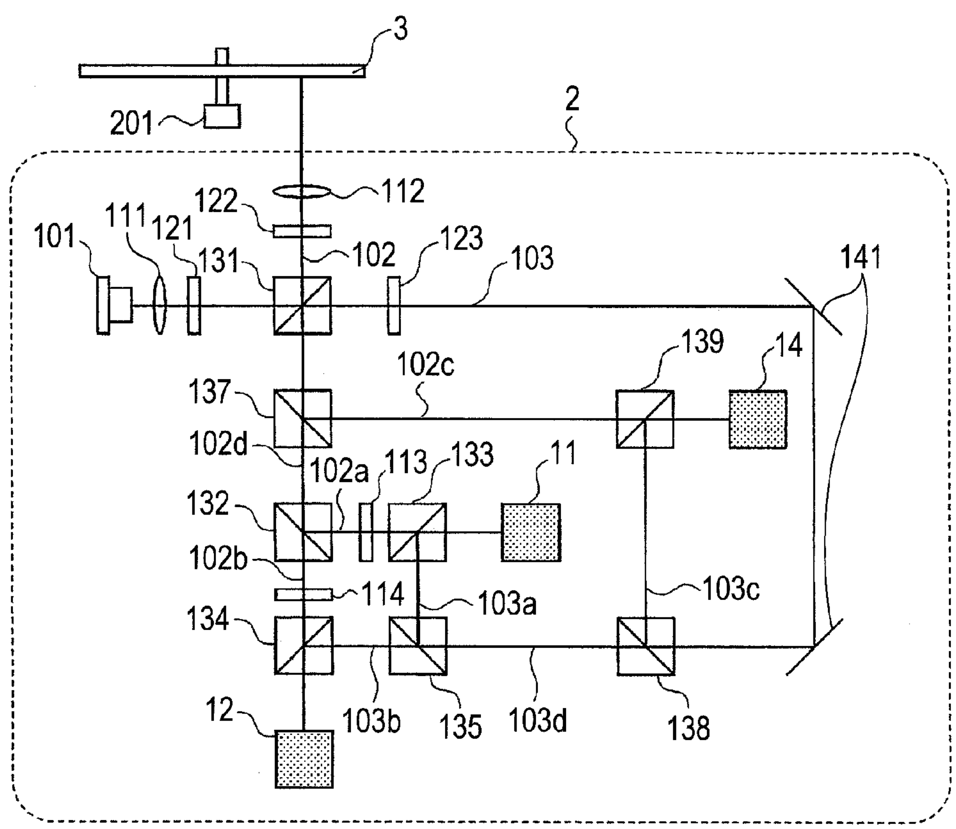
FIG. 29 is a diagram to show still another construction example of the optical pickup for realizing the optical information detection method according to the present invention.

In the ninth embodiment, the first reference light 103a and the second reference light 103b are given defocuses which are opposite in sign. However, as another embodiment according to the present invention, it may be the first signal light 102a and the second signal light 102b that are given defocuses which are opposite in sign. For example, in the optical pickup 2 shown in FIG. 19, the first reference light 103a is defocused in front by the first lens 113 and the second reference light 103b is defocused behind by the second lens 114. However, for example, as shown in FIG. 29, the first signal light 102a may be defocused in front by the first lens 113 and the second signal light 102b may be defocused behind by the second lens 114. Alternatively, in the optical pickup 2 shown in FIG. 20, FIG. 21, and FIG. 23, the reference light 103 is defocused in front and behind by the curvilinear diffraction grating 1301 shown in FIG. 14 and the signal light 102 is not given defocus by the linear diffraction grating 1302. In contrast to this, the following construction may be employed: for example, the curvilinear diffraction grating 1301 is disposed in the light path of the signal light 102 and the linear diffraction grating 1302 is disposed in the light path of the reference light 103; and the signal light 102 is defocused in front and behind by the curvilinear diffraction grating 1301 and the reference light 103 is given defocus by the linear diffraction grating 1302. In this way, the same effects of the invention as in the ninth embodiment can be produced.

Eleventh Embodiment

In the present embodiment, the signal light and the reference light are detected by four first detectors and four second detectors and the RF signal RF2 is produced by the four first detectors and the focus error signal FES2 is produced by the four second detectors.

<Construction of Two Sets of Detection Optics (One Set for RF, One Set for FES)>

Figure 24:
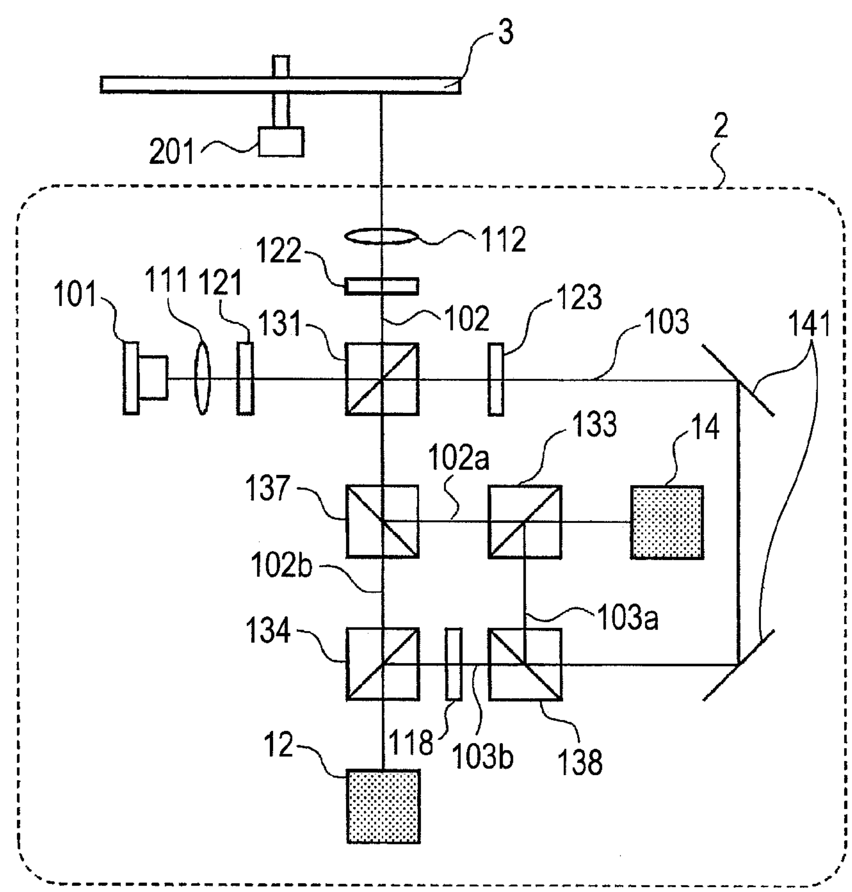
FIG. 24 is a diagram to show still another construction example of the optical pickup for realizing the optical information detection method according to the present invention.

FIG. 24 shows one example of an optical system of the optical pickup 2 of the present embodiment. Here, as for the construction and the function of the optical pickup 2 shown in FIG. 24, the descriptions of the parts each of which has a construction denoted by the same reference sign as in FIG. 1, FIG. 19 described above and has the same function as in FIG. 1, FIG. 19 will be omitted.

The signal light 102 reflected by the optical disk 3 is transmitted through the objective lens 112 and the quarter wave plate 122, thereby being made the parallel polarized light. The parallel polarized light is transmitted through the polarizing beam splitter 131 and is split into the first signal light 102*a* and the second signal light 102*b* by the beam splitter 137. The first signal light 102*a* and the second signal light 102*b* travel toward the detection optics 14 and the detection optics 12, respectively.

Further, the reference light 103 of the parallel polarized light transmitted through the half wave plate 121 and the polarizing beam splitter 131 is converted into the perpendicular polarized light and then is reflected by the reference light reflection means 141 and then is split into the first reference light 103*a* and the second reference light 103*b* by the beam splitter 138. The first reference light 103*a* reflected by the beam splitter 138 is reflected by the polarizing beam splitter 133 and travels toward the detection optics 14. The second reference light 103*b* transmitted through the beam splitter 138 is transmitted through a liquid crystal element 118 and is reflected by the polarizing beam splitter 134 and then travels toward the detection optics 12.

<Method for Acquiring Two Sets of Sum-of-Squares Signals Sig2, Sig 3, Calculation of RE and FES>

The first signal light 102*a* and the first reference light 103*a* are mixed by the detection optics 14 in the state in which their polarization directions are perpendicular to each other. The second signal light 102*b* and the second reference light 103*b* are mixed by the detection optics 12 in the state in which their polarization directions are perpendicular to each other. The detection optics 12, 14 are realized, for example, by the construction shown in FIG. 3, respectively. The sum-of-squares signal Sig3 is produced from the output of the detection optics 14 as shown by the formula (20) and is made the RF signal RF2. Further, the sum-of-squares signal Sig2 is produced from the output of the detection optics 12 as shown by the formula (8) and the focus error signal FES2 is produced in the following manner.

The second reference light 103*b* transmitted through the beam splitter 138 is incident on the liquid crystal element 118. The liquid crystal element 118 has a function of giving a luminous flux incident thereon a predetermined defocus wavefront aberration in response to voltage applied thereto. Hence, the controller 202 controls the voltage applied to the liquid crystal element 118 via the servo control circuit 204. For example, the controller 202 applies square-wave, sine-wave, or sawtooth-wave voltage to the liquid crystal element 118. In this way, the voltage applied to the liquid crystal element 118 becomes +V at time t or −V at time (t+Δt) and the defocus wavefront aberration given to the incident luminous flux becomes $+W_{20}$ or $-W_{20}$. In synchronization with this modulation, the controller 202 produces the sum-of-squares signals Sig2(*t*), Sig2 (t+Δt) from the output of the detection optics 12.

$$FES2=Sig2(t+\Delta t)-Sig2(t) \quad (24)$$

From the above formula (24), the focus error signal is acquired.

According to the present embodiment, the RF signal and the focus error signal can be acquired independently from the output of other detection optics. Hence, the RF signal efficiently amplified by the reference light can be acquired and at the same time the pull-in range of the focus error signal can be designed independently of the amplification factor of the readout signal.

<Another Construction of Two Sets of Detection Optics (Liquid Crystal→Insertion or Removal of Lens)>

Figure 25:
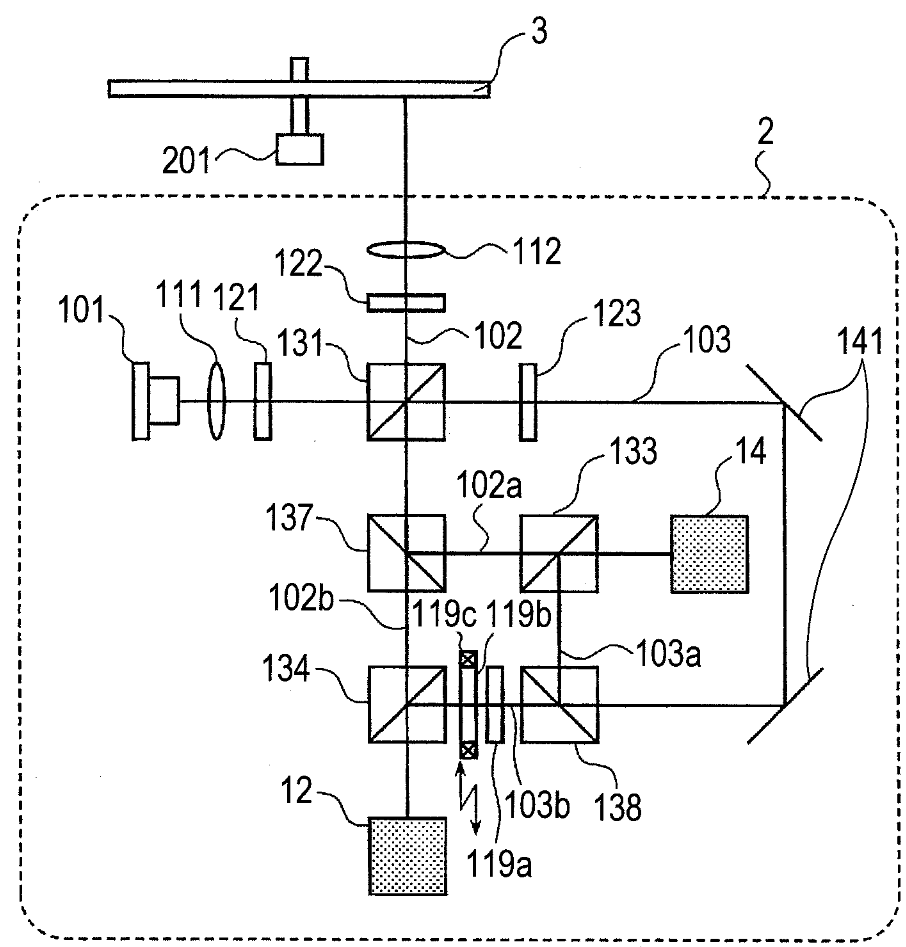
FIG. 25 is a diagram to show still another construction example of the optical pickup for realizing the optical information detection method according to the present invention.

In the optical pickup 2 shown in FIG. 24, the liquid crystal element is used for giving the luminous flux the in front/behind defocus wavefront aberration $\pm W_{20}$, but this can be realized, for example, by inserting or removing a lens as shown in FIG. 25.

The second reference light 103*b* transmitted through the beam splitter 138 is transmitted through a first lens 119*a* and a second lens 119*b* and is reflected by the polarizing beam splitter 134 and then travels toward the detection optics 12. The controller 202 produces the focus error signal FES2 from a time difference signal of the sum-of-squares signal Sig2 produced from the output of the detection optics 12 shown by the formula (24) in synchronization with inserting or removing the second lens 119*b* by an actuator 119*c*. Further, the first lens 119*a* has a positive power ϕ and, when the second lens 119*b* is held inserted, the mixed power of the first lens 119*a* and the second lens 119*b* is made −ϕ (when the spacing of the lenses is 0, the power of the second lens 119*b* only has to be made −2ϕ.

<Another Construction of Two Sets of Detection Optics (Liquid Crystal→Convergence by Lens, Driving Reflective Mirror in Front or Behind)>

Figure 26:
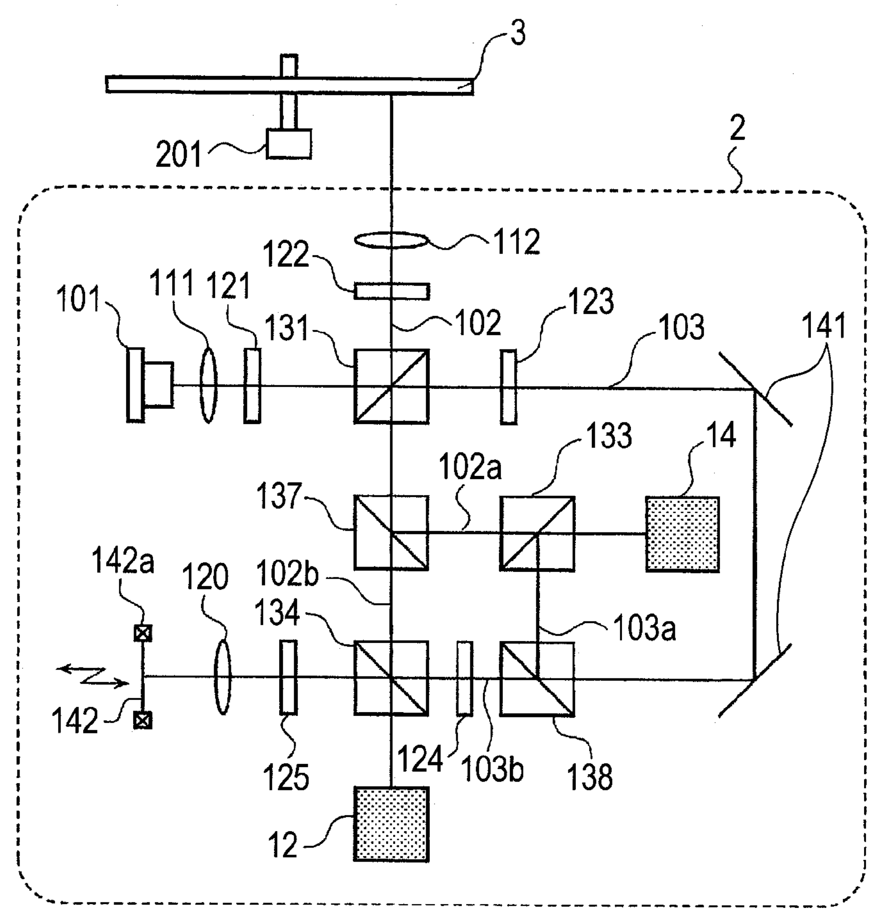
FIG. 26 is a diagram to show still another construction example of the optical pickup for realizing the optical information detection method according to the present invention.

Further, a unit to give the in front/behind defocus wavefront aberrations $\pm W_{20}$ of the present embodiment may be realized, for example, as shown in FIG. 26, by collecting the reference light onto a reflective mirror and by driving the reflective mirror in front or behind.

The second reference light 103*b* transmitted through the beam splitter 138 is made the parallel polarized light by a half wave plate 124 and is transmitted through the polarizing beam splitter 134. Further, the second reference light 103*b* is made a circularly polarized light by a quarter wave plate 125 and then is collected onto a reflection means 142 by the lens 120. The second reference light 103*b* reflected by the reflection means 142 is again made a collimated light by the lens 120 and then is made the perpendicular polarized light by the quarter wave plate 125 and is reflected by the polarizing beam splitter 134 and then travels toward the detection optics 12. The controller 202 produces the focus error signal FES2 from the time difference signal of the sum-of-squares signal Sig2 produced by the output of the detection optics 12 shown by the formula (24) in synchronization with driving the reflection means 142 in the optical axis direction near the focal point of the reference light 103*b* by the lens 120 by an actuator 142*a*. Here, the actuator 142*a* drives the reflection means 142 in the optical axis direction in such a way that the defocus wavefront aberration given to the second reference light 103*b* becomes $+W_{20}$ or $-W_{20}$.

<Another Example of Beam Splitter 137 (138) for Splitting Third Signal (Reference) Light and First and Second Signal (Reference) Lights>

In the present embodiment, the splitting ratio of the first signal light 102*a* to the second signal light 102*b* by the beam splitter 137 can be arbitrarily determined, but in order to increase the amplitude of the RF signal, it is desired to make the amount of light of the first signal light 102*a* larger than the amount of light of the second signal light 102*b*. Further, the splitting ratio of the first reference light 103*a* to the second reference light 103*b* by the beam splitter 138 can be arbitrarily determined.

Twelfth Embodiment

Figure 30:
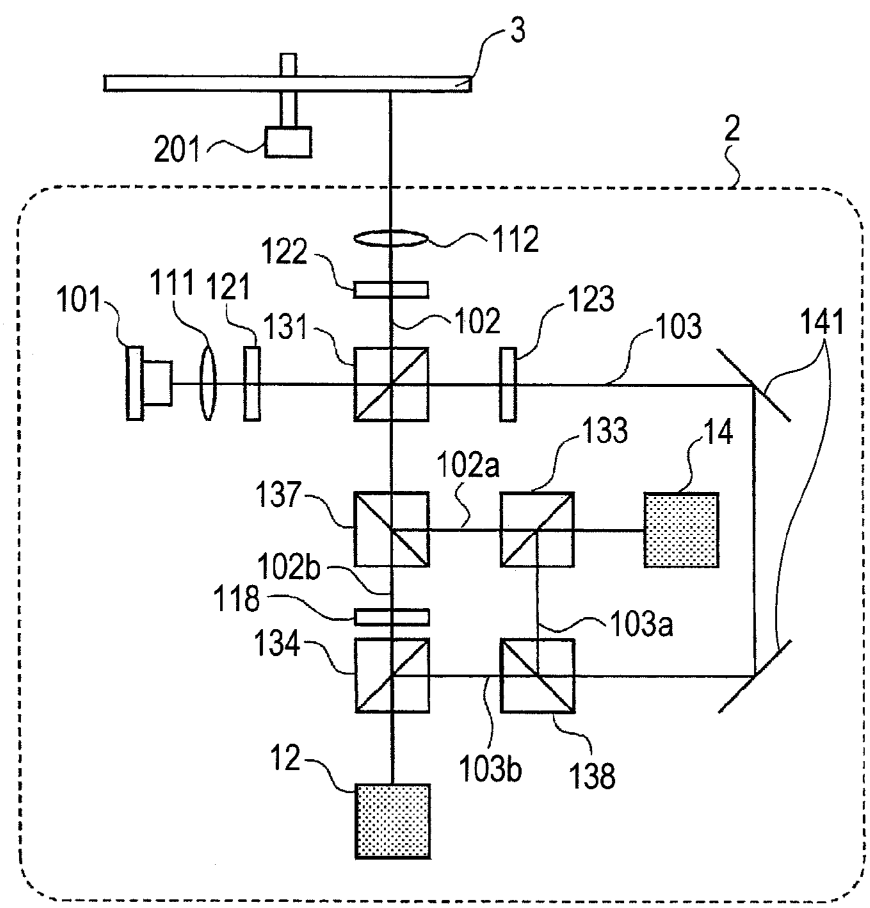
FIG. 30 is a diagram to show still another construction example of the optical pickup for realizing the optical information detection method according to the present invention.
Figure 31:
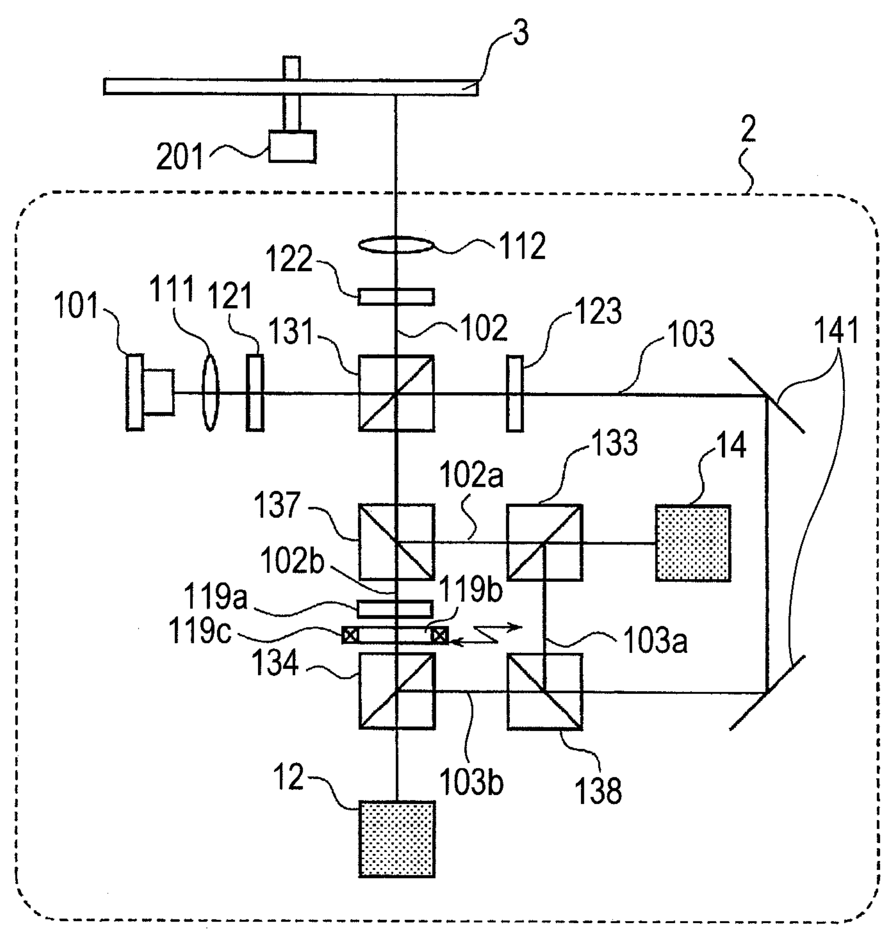
FIG. 31 is a diagram to show still another construction example of the optical pickup for realizing the optical information detection method according to the present invention.
Figure 32:
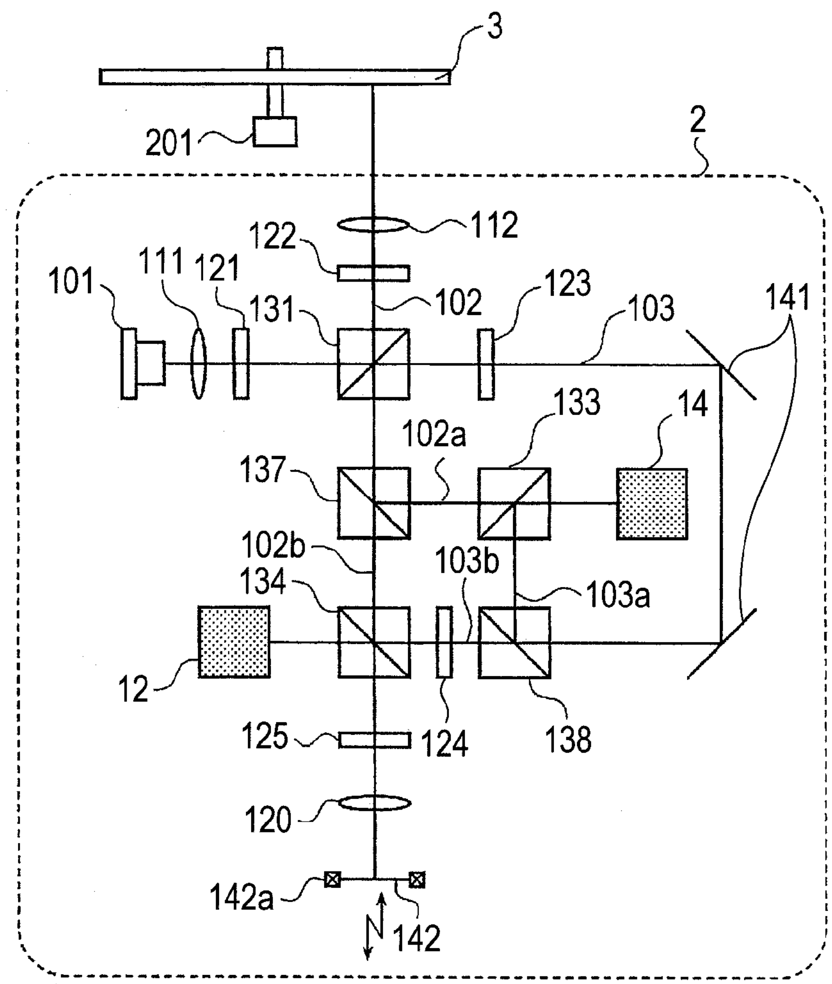
FIG. 32 is a diagram to show still another construction example of the optical pickup for realizing the optical information detection method according to the present invention.

In the eleventh embodiment, the second reference light 103*b* is given the in front/behind defocuses. However, as another embodiment according to the present invention, it may be the second signal light 102*b* that is given the in front/behind defocuses. For example, in the optical pickup 2 shown in FIG. 24, the second reference light 103*b* is defocused in front or behind by the liquid crystal element 118, but as shown in FIG. 30, the second signal light 102*b* may be defocused in front or behind by the liquid crystal element 118. Further, in the optical pickup 2 shown in FIG. 25, the second reference light 103*b* is transmitted through the first lens 119*a* and the second lens 119*b* and is defocused in front or behind by inserting or removing the second lens 119*b* by the actuator 119*c*. In contrast to this, the following construction may be employed: for example, as shown in FIG. 31, the second signal light 102*b* is transmitted through the first lens 119*a* and the second lens 119*b* and is defocused in front or behind by inserting or removing the second lens 119*b* by the actuator 119*c*. Still further, in the optical pickup 2 shown in FIG. 26, the second reference light 103*b* is collected onto the reflection means 142 by the lens 120 and is defocused in front or behind by driving the reflection means 142 in the optical axis direction near the focal point of the lens 20 by the actuator 142*a*. In contrast to this, the following construction may be employed: as shown in FIG. 32, the second signal light 102*b* is collected onto the reflection means 142 by the lens 120 and is defocused in front or behind by driving the reflection means 142 in the optical axis direction near the focal point of the lens 20 by the actuator 142*a*. In the optical pickup 2 shown in FIG. 32, the second reference light 103*b* transmitted through the beam splitter 138 is converted from the perpendicular polarized light into the parallel polarized light by the half wave plate and then is transmitted through the polarizing beam splitter 134 and travels toward the detection optics 12. The second signal light 102*b* of the parallel polarized light transmitted through the beam splitter 137 is transmitted through the beam splitter 134. Further, the second signal light 102*b* is converted into the circularly polarized light by the quarter wave plate 125 and then is collected onto the reflection means 142 by the lens 120. The second signal light 102*b* reflected by the reflection means 142 is again made the collimated light by the lens 120 and then is made the perpendicular polarized light by the quarter wave plate 125 and is reflected by the polarizing beam splitter 134 and travels toward the detection optics 12. The controller 202 produces the focus error signal FES2 from the time difference signal of the sum-of-squares signal Sig2 produced from the output of the detection optics 12 shown by the formula (24) in synchronization with driving the reflection means 142 in the optical axis direction near the focal point of the signal light 102*b* by the lens 120 by the actuator 142*a*. Here, the actuator 142*a* drives the reflection means 142 in the optical axis direction in such a way that the defocus wavefront aberration given to the second signal light 102*b* becomes $+W_{20}$ or $-W_{20}$.

In this way, the same effect of the present invention as in the eleventh embodiment can be produced.

What is claimed is:

1. An information reproducing apparatus comprising:

a laser source;

a splitting unit to split a luminous flux emitted from the laser source into a first luminous flux as a signal light and a second luminous flux as a reference light, the second luminous flux being not collected on an optical information recording medium;

a detector to detect an interfering light of the signal light and the reference light;

a unit to make the signal light optically interfere with the reference light on the detector in a state in which a phase relationship between the signal light and the reference light is different from each other;

a defocusing unit to defocus one of the first luminous flux and the second luminous flux in front or behind with respect to other of the first luminous flux and the second luminous flux focused on a predetermined layer of the optical information recording medium; and a unit to find a focus error signal from a difference signal between interfering lights defocused in front and behind.

2. The information reproducing apparatus according to claim 1, the detector including a first detector and a second detector, the first detector detecting an interfering light of the first luminous flux and the second luminous flux defocused in front, the second detector detecting an interfering light of the first luminous flux and the second luminous flux defocused behind, the apparatus comprising a unit to find an RF signal from a sum signal of a signal detected by the first detector and a signal detected by the second detector.

3. The information reproducing apparatus according to claim 1, the detector including a first detector and a second detector, the first detector detecting an interfering light of the second luminous flux and the first luminous flux defocused in front, the second detector detecting an interfering light of the second luminous flux and the first luminous flux defocused behind, the apparatus comprising a unit to find an RF signal from a sum signal of a signal detected by the first detector and a signal detected by the second detector.

4. The information reproducing apparatus according to claim 1, wherein the detector includes a first detector, a second detector, and a third detector, wherein the second luminous flux is a luminous flux defocused in front and behind with respect to the first luminous flux focused on a predetermined layer of the optical information recording medium and a luminous flux not defocused, comprising:

a unit to detect an interfering light of the first luminous flux and the second luminous flux not defocused by the third detector to acquire an RF signal, wherein an interfering light of the first luminous flux and the second luminous flux defocused in front is detected by the first detector, wherein an interfering light of the first luminous flux and the second luminous flux defocused behind is detected by the second detector, and wherein a focus error signal is found from a difference signal between a signal detected by the first detector and a signal detected by the second detector.

5. The information reproducing apparatus according to claim 1, wherein the detector includes a first detector, a second detector, and a third detector, wherein the first luminous flux is a luminous flux defocused in front and behind with respect to the second luminous flux focused on the first, second, and third detectors and a luminous flux not defocused, comprising:

a unit to detect an interfering light of the second luminous flux and the first luminous flux not defocused by the third detector to thereby acquire an RF signal, wherein an interfering light of the second luminous flux and the first luminous flux defocused in front is detected by the first detector, wherein an interfering light of the second luminous flux and the first luminous flux defocused behind is detected by the second detector, and wherein a focus error signal is found from a difference signal between a signal detected by the first detector and a signal detected by the second detector.

6. The information reproducing apparatus according to claim 1, wherein the detector includes a first detector and a second detector, wherein a signal light of the first luminous flux is split into a first signal light and a second signal light, wherein a reference light of the second luminous flux is split into a first reference light and a second reference light, wherein an interfering light of the first signal light and the first reference light is detected by the first detector, whereby an RF signal is acquired, wherein an interfering light of the second signal light and the second reference light is detected by the second detector, wherein the defocusing means is disposed in a light path of the second reference light, wherein the defocusing unit defocuses the second reference light in front and behind with respect to the second signal light focused on a predetermined layer of the optical information recording medium at a time t and at a time (t+Δt), and wherein the focus error signal is acquired from a difference between an output Sig2(*t*) of the second detector at the time t and an output Sig2 (t+Δt) of the second detector at the time (t+Δt).

7. The information reproducing apparatus according to claim 1, wherein the detector includes a first detector and a second detector, wherein a signal light of the first luminous flux is split into a first signal light and a second signal light, wherein a reference light of the second luminous flux is split into a first reference light and a second reference light, wherein an interfering light of the first signal light and the first reference light is detected by the first detector, whereby an RF signal is acquired, wherein an interfering light of the second signal light and the second reference light is detected by the second detector, wherein the defocusing means is disposed in a light path of the second signal light, wherein the defocusing means defocuses the second signal light in front and behind with respect to the second reference light focused on the second detector at a time t and at a time (t+Δt), and wherein the focus error signal is acquired from a difference between an output Sig2(*t*) of the second detector at the time t and an output Sig2(*t*+Δt) of the second detector at the time (t+Δt).

8. The information reproducing apparatus according to claim 1, wherein the detector includes a first detector and a second detector, wherein the first detector includes four detectors, wherein a phase relationship between a signal light of the first luminous flux and a reference light of the second luminous flux is different from each other by about 90 degrees on the four detectors of the first detector, wherein in the first detector, differences between the interfering lights on a pair of detectors in which phases are different from each other by about 180 degrees are detected, whereby Sig11 and Sig12 are acquired, wherein the second detector includes four detectors, wherein a phase relationship between a signal light of the first luminous flux and a reference light of the second luminous flux is different from each other by about 90 degrees on the four detectors of the second detector, wherein in the second detector, differences between the interfering lights on a pair of detectors in which phases are different from each other by about 180 degrees are detected, whereby Sig21 and Sig22 are acquired, and wherein the focus error signal is found on the basis of the Sig11, Sig12, Sig21, and Sig22.

9. The information reproducing apparatus according to claim 8, wherein the detector includes a third detector, wherein the third detector includes four detectors, wherein a phase relationship between a signal light of the first luminous flux and a reference light of the second luminous flux is different from each other by about 90 degrees on the four detectors of the third detector, wherein in the third detector, differences between the interfering lights on a pair of detectors in which phases are different from each other by about 180 degrees are detected, whereby Sig31 and Sig32 are acquired, and wherein an RF signal is acquired on the basis of Sig31, Sig32.

10. The information reproducing apparatus according to claim 8, wherein the difference is detected by a differential detector of a current differential type.

11. The information reproducing apparatus according to claim 8, wherein a square of the Sig11 is added to a square of Sig12 to acquire a sum signal Sig1, wherein a square of the Sig21 is added to a square of Sig22 to acquire a sum signal Sig2, and wherein the focus error signal is acquired from a difference signal between the Sig1 and the Sig2.

12. The information reproducing apparatus according to claim 1, wherein the defocusing means is a curvilinear diffraction grating.

13. The information reproducing apparatus according to claim 1, wherein in front/behind wavefront aberrations given to the first luminous flux or the second luminous flux by the defocusing means are opposite to each other in sign and are equal to each other in absolute value.

14. The information reproducing apparatus according to claim 1, comprising:

a unit to adjust an optical phase difference between the signal light and the reference light is disposed in a light path of the reference light.

15. An information reproducing apparatus comprising:

a laser source;

a first optical splitting element for splitting a luminous flux emitted from the laser source;

a collecting optical system for collecting one of luminous fluxes, into which the luminous flux emitted from the laser light is split by the first optical splitting element, on an optical information recording medium;

a variable focusing mechanism for varying a focal position of light collected in the collecting optical system;

a first detector for detecting a signal light collected on and reflected by the optical information recording medium;

an interfering optical system for making a signal light collected on and reflected by the optical information recording medium optically interfere with a reference light acquired from other of the split luminous fluxes;

a splitting optical system for splitting an interfering light in the interfering optical system into a plurality of interfering lights;

a plurality of second detectors each of which detects each of the plurality of interfering lights split by the splitting optical system in a state in which the plurality of interfering lights are different from each other in a phase relationship; and a switching unit to switch between a focus error signal acquired from a signal light detected by the first detector and a focus error signal acquired from an interfering light detected by the plurality of second detectors, wherein the switching means switches between the focus error signals to thereby control the variable focusing mechanism.

* * * * *